US012694523B2

(12) United States Patent
Shi et al.

(10) Patent No.: US 12,694,523 B2
(45) Date of Patent: Jul. 28, 2026

(54) SUPER-RESOLUTION STIMULATED RAMA SCATTERING MICROSCOPY WITH ADAM OPTIMIZATION-BASED POINTILLISM DECONVOLUTION (A-PoD)

(71) Applicant: The Regents of the University of California, Oakland, CA (US)

(72) Inventors: Lingyan Shi, La Jolla, CA (US); Hongje Jang, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 328 days.

(21) Appl. No.: 18/485,043

(22) Filed: Oct. 11, 2023

(65) Prior Publication Data

US 2024/0135537 A1     Apr. 25, 2024

Related U.S. Application Data

(60) Provisional application No. 63/379,226, filed on Oct. 12, 2022.

(51) Int. Cl.
G06T 7/00 (2017.01)
G06T 3/4053 (2024.01)
(52) U.S. Cl.
CPC .......... G06T 7/0012 (2013.01); G06T 3/4053 (2013.01); G06T 2207/10056 (2013.01); G06T 2207/30016 (2013.01); G06T 2207/30024 (2013.01)

(58) Field of Classification Search
CPC ................ G06T 7/0012; G06T 3/4053; G06T 2207/10056; G06T 2207/30016; G06T 2207/30024
See application file for complete search history.

(56) References Cited

U.S. PATENT DOCUMENTS

| 12,266,081 | B2 * | 4/2025 | Chen | ......................... | G06T 5/10 |
| 2024/0319097 | A1 * | 9/2024 | Ma | ....................... | G02B 21/367 |
| 2025/0020902 | A1 * | 1/2025 | Jia | ....................... | G02B 21/361 |

OTHER PUBLICATIONS

Jang, H., Li, Y., Fung, A. A., Bagheri, P., Hoang, K., Skowronska-Krawczyk, D., . . . & Shi, L. (2022). Super-resolution stimulated Raman Scattering microscopy with A-PoD. bioRxiv, Jun. 2022 (Year: 2022).*
Sage D, Donati L, Soulez F, Fortun D, Schmit G, Seitz A, et al. DeconvolutionLab2: An open-source software for deconvolution microscopy. Methods. 2017; 115:28-41.

(Continued)

*Primary Examiner* — Jennifer Mehmood
*Assistant Examiner* — Vaisali Rao Koppolu
(74) *Attorney, Agent, or Firm* — Meunier Carlin & Curfman LLC

(57)     ABSTRACT
An Adam optimization-based Pointillism Deconvolution (A-PoD) algorithm for quantitatively measuring the nanoscopic co-localization of biomolecules and metabolic dynamics in organelles. The A-Pod algorithm may be applied to an image to generate a series of super resolved images. The A-PoD algorithm may also be used to process cellular images by interpolating cellular images along an optical axis, resampling the cellular images, and optimizing the cellular images with the A-PoD algorithm, where the resulting cellular images are deconvoluted cellular images.

15 Claims, 16 Drawing Sheets

(56)             References Cited

OTHER PUBLICATIONS

Zhu L, Zhang W, Elnatan D, Huang B. Faster STORM using compressed sensing. Nature methods. 2012;9(7):721-3.

Min J, Vonesch C, Kirshner H, Carlini L, Olivier N, Holden S, et al. FALCON: fast and unbiased reconstruction of high-density super-resolution microscopy data. Scientific reports. 2014;4(1):1-9.

Hugelier S, De Rooi JJ, Bernex R, Duwé S, Devos O, Sliwa M, et al. Sparse deconvolution of high-density super-resolution images. Scientific reports. 2016;6(1):1-11.

Martínez S, Toscani M, Martinez OE. Superresolution method for a single wide-field image deconvolution by superposition of point sources. Journal of microscopy. 2019;275(1):51-65.

Wallace W, Schaefer LH, Swedlow Jr. A workingperson's guide to deconvolution in light microscopy. Biotechniques. 2001;31(5):1076-97.

* cited by examiner a. Standard sample (Polystyrene beads)
i. 2D image (270 nm bead)
ii. 3D image (1 μm bead)
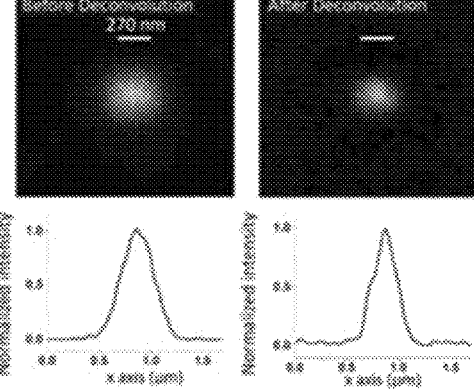
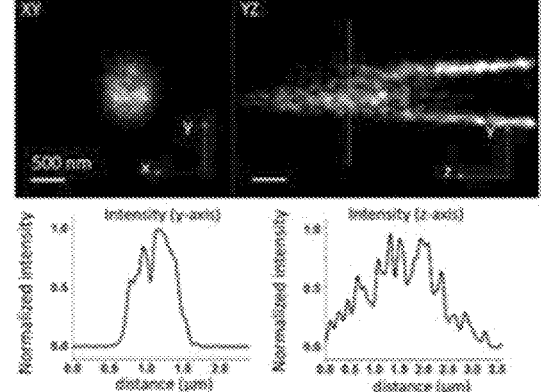
b. 2D stimulated raman spectroscopy (retina)
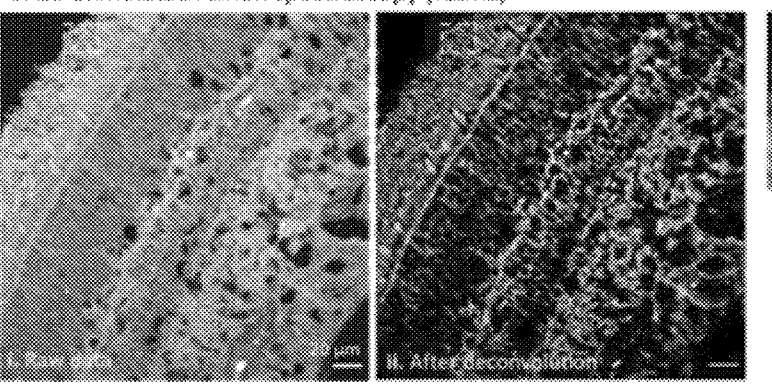
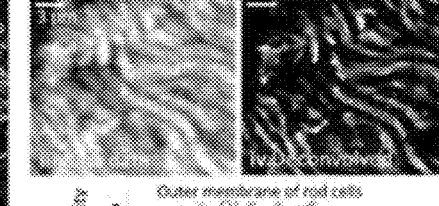
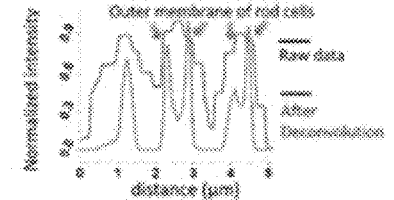
c. 3D stimulated raman spectroscopy (lipid droplets in live cell)
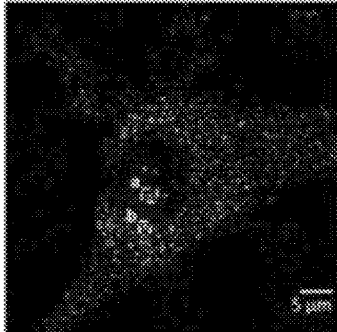
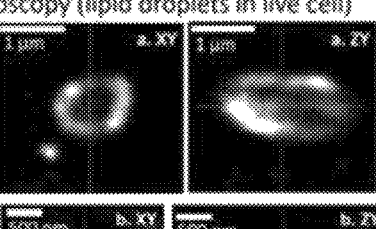
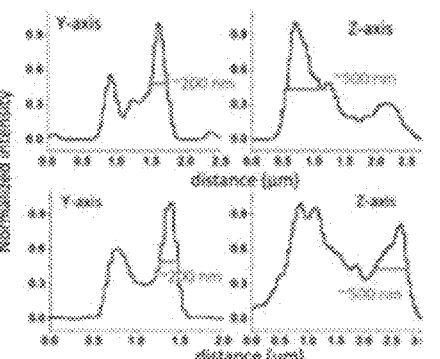
FIGS. 2A-2C

SUPER-RESOLUTION STIMULATED RAMA SCATTERING MICROSCOPY WITH ADAM OPTIMIZATION-BASED POINTILLISM DECONVOLUTION (A-PoD)

CROSS REFERENCE TO RELATED APPLICATIONS

This application claims priority to U.S. Provisional Application 63/379,226 filed on Oct. 12, 2022, the entire contents of which are incorporated by reference.

TECHNICAL FIELD

The present invention relates to an Adam optimization-based Pointillism Deconvolution (A-PoD) algorithm for quantitatively measuring the nanoscopic co-localization of biomolecules and metabolic dynamics in organelles.

BACKGROUND

Raman imaging is a vibrational spectroscopy technique that measures the scattered light corresponding to the vibration of molecules. When incident light alters the polarizability of a molecule, the wavelength of the scattered signal is changed by the resulting vibrational modes. Although Raman scattering imaging reveals structural information of a molecule based on the wavelength change of this scattering signal, the signal of spontaneous Raman scattering is weak, and it is difficult to achieve high speed imaging. In 2008, it was shown that stimulated Raman scattering (SRS) could produce greatly amplified signal intensities, and has been widely applied to bioimaging ever since[1-3]. About 10 years later, deuterium oxide probed stimulated Raman scattering (DO-SRS) imaging platform was reported to have the capability of imaging metabolic dynamics, with a greatly enhanced signal-to-noise-ratio[3]. However, the spatial resolution of SRS imaging still needs improvement. A variety of super-resolution approaches that are capable of detecting single molecule signals have been developed for fluorescence microscopy[4-6]. Such methods can achieve a few nanometers or sub-nanometer resolution[7-9]. Recently, several super-resolution SRS techniques have been developed[10-19]. Nonetheless, it is still challenging to achieve super-resolved Raman imaging without manipulating the samples, and to preserve the temporal resolution without any labeling or additional physical or chemical treatment.

Image deconvolution is a computational strategy that removes distortion[20]. Distortion in optical microscopy results in an image blurred by light diffraction, and this blurring is expressed as a point spread function (PSF). A PSF model and deconvolution method allow for enhanced resolution of microscopic images. Several deconvolution methods, such as compressed sensing stochastic optical reconstruction microscopy (CSSTORM)[21], fast localization algorithm based on a continuous-space formulation (FALCON)[22], and sparse image deconvolution and reconstruction (SPIDER)[23], have been developed to achieve super-resolved images by localization of single fluorescence emitters. These methods successfully enhanced the temporal resolution of localization microscopy. However, these methods cannot localize the emitters in general widefield microscopy images and are not capable of detecting single-molecule signals when images are taken with low-sensitivity sensors.

To overcome these limitations, a deconvolution method was developed[24] to fit the measured data by a superposition of virtual point sources (SUPPOSe). This method approximates a super-resolution image by placing a limited number of virtual emitters on the image and optimizing the position of each emitter. The characteristics of this approach are the fixed total intensity as a certain number and quantization of the intensity in each pixel. SUPPOSe sets the total number of virtual emitters, and each emitter has the same unit intensity. The fixed total intensity prevents virtual emitters from deviating away from the optimized position. Because of this characteristic the residual images, such as ring artifacts[25], can be removed. Additionally, due to the fixed unit intensity, intensities at each pixel can only be multiples of the unit intensity. These characteristics of SUPPOSe produce resulting images with extremely high sparsity, overcoming the limits of previously mentioned deconvolution methods. However, SUPPOSe still has major drawbacks, such as low processing speed and low precision of a signal's special location.

SUMMARY OF THE INVENTION

Disclosed herein is an Adam optimization-based Pointillism Deconvolution (A-PoD) algorithm for quantitatively measuring the nanoscopic co-localization of biomolecules and metabolic dynamics in organelles.

In embodiments, the disclosure provides a deconvolution method, where the method includes applying an A-PoD algorithm to an image, and generating a series of super-resolved images. In some embodiments, the method is effective to enhance the special resolution of an image at a high processing speed. In some embodiments, the series of super-resolved images enables examination of protein and lipid distribution at a nanoscopic level. The examination of protein and lipid distribution may involve direct visualization of lipid metabolic changes in cells or brain tissue. In some embodiments, the A-Pod algorithm is configured for use with one or more gradient descent optimization algorithms. In some embodiments, generating a series of super-resolved images includes removing one or more low frequency signals. The one or more signals may be removed using spline or Fourier filtering methods. In some embodiments, the method also includes automatically estimating one or more virtual emitters based on a measured characteristic of the image. The measured characteristic of the image may be a variance and/or a mean intensity of the image. In some embodiments, the image is derived from photoacoustic microscopy, infrared microscopy, and/or phase contrast microscopy. The super-resolved images may enable determination of a point spread function of the image. In some embodiments, a range in which the A-Pod algorithm is applied is based on a frequency domain of the image.

In embodiments, the disclosure provides a method of processing cellular images, where the method includes interpolating cellular images along an optical axis, resampling the cellular images, and optimizing the cellular images with an A-PoD algorithm, wherein the resulting cellular images are deconvoluted cellular images. In some embodiments, the A-PoD algorithm is customizable according to the pixel size of the cellular images. In some embodiments, the method also includes counting the lipid droplets of the deconvoluted cellular images.

BRIEF DESCRIPTION OF THE DRAWINGS

FIG. 1A. Schematic of super-resolution SRS image processing. FIG. 1B. 3D deconvolution result of lipid droplets (2850 cm$^{-1}$) in a live cell. Following deconvolution, the membrane of an individual LD was clearly visualized in the intensity profile in the lower panel. FIG. 1C. 3D rendering results of the SRS image before (i) and after (ii) deconvolution. After deconvolution, the shape of ~1 μm sized lipid droplets was clearly visible.

FIGS. 2A-2C. Deconvolution results of SRS images. FIG. 2A. Images of standard beads (270 nm and 1 μm beads at 3066 cm$^{-1}$). In panel (i), after the deconvolution of a 2D image of a 270 nm bead, FWHM of the intensity profile was decreased from 364 nm to 271 nm. Panel (ii) shows 3D images of a 1 micron bead before and after deconvolution, together with the corresponding signal intensity profiles. The lateral size of the bead was almost 1 μm, but the axial size was over 2.5 times bigger than lateral size. The tail-like artifact was not removed by A-PoD. FIG. 2B. An SRS image of a human retinal section (at 2930 cm$^{-1}$). After deconvolution using A-PoD, contrast of the image was markedly enhanced. Deconvolution results revealed the rod outer segment cell membrane-like intensity profile. The boxed area in the outer segment by the dotted lines in (i) and (ii) is enlarged and shown in (iii) and (iv). FIG. 2C. Deconvolution result of 3D SRS images (2850 cm$^{-1}$) lipid droplets in a live cell. Following deconvolution, the detailed structure of LDs was more clearly visualized, including the internal score and the surface membrane.

FIG. 3A. SA:V ratio of lipid droplets in the breast cancer cell image in FIG. 2C was mapped. FIG. 3B. K-mean clustering result shows that the three groups of lipid droplets have different SA:V ratio. FIG. 3C. The lipid droplet images in different groups (FIGS. 2D-2F) were overlaid. FIG. 2D. Lipid droplets in group 1 are widely distributed in the cell, with a low SA:V ratio. FIG. 2E. Lipid droplets in group 2 have a high SA:V ratio, and they are distributed closely around the nucleus. FIG. 2F. Lipid droplets in group 3 also have a high SA:V ratio, and they were distributed far away from the nucleus.

FIG. 4A. DO-SRS images of lipid droplets in CH2 and CD channels. The CH2 channel represents the distribution of old lipid droplets (i), and the CD vibration image shows the distribution of newly synthesized lipid droplets (ii). To compare the two images (i and ii), the images were overlaid (iii). FIG. 4B. DO-SRS images were deconvolved using A-PoD, and the results clearly separate the signals of two different types of LDs, old vs. newly-synthesized (i, ii, and iii). FIG. 4C. Averaged volume and surface area of each lipid droplets in the two different culture conditions were plotted. The LDs in the cell cultured with excessive tryptophan (Tryp) have wider distribution than those in the control group (Ctrl). The images of the control cell are presented in FIG. 10. FIG. 4D. The surface area to volume ratio of individual lipid droplets was mapped. Using color code, the SA:V was visualized. FIG. 4E. The 3D rendering images of the white dotted boxed regions in panels a (iii) and b (iii) show the resolution difference before and after deconvolution (i and ii).

FIG. 5A. Schematic of the analysis method. The whole sample image represents the overall lipid distribution. Image was zoomed in to compare the new lipids and old lipids signal distribution of old and new lipids. The nanoscopic distribution of lipids were revealed after deconvolution. The particle analysis method enables removing the background and analyze individual lipid droplet. FIG. 5B. Brain samples from flies on two different diets were measured using DO-SRS microscopy. The sample in 3× glucose group (red boxed images, yellow: —CH$_2$ signal, cyan: —CD signal) and control group (green boxed images, yellow: —CH$_2$ signal, cyan: —CD signal) were analyzed. The images before the overlay are displayed in FIGS. 13A-13B. FIG. 5C. The average signal intensity of the images in two groups. The average signal intensity of old lipid in the control group was slightly higher than the 3× glucose group. The new lipid signal in the 3× glucose group was much higher than the control group. The new lipid signal difference was clearer in zoom-in image. FIG. 5D. The scattered plot shows the distribution of new lipid:old lipid (CD/CH$_2$) signal ratio of individual lipid droplets. Under the two different dietary conditions, the lipid droplets have clearly distinguishable CD/CH$_2$ signal ratio. The average turnover rate in the 3× glucose group is over 10 times larger than the rate of the control group. FIG. 5E. Using the particle analysis, the nanoscopic distribution of newly synthesized lipids in individual LDs can be visualized. Boxed areas by pink dashed lines in the images in FIG. 5B are enlarged and shown.

FIG. 6A. The multiplexed imaging scheme. Images were taken in MPF channel (mitochondria) and two SRS channels (protein, lipid) simultaneously, and then deconvolved using A-PoD. FIG. 6B. Mitochondria in HEK293 cells were labeled with Mito-Red (magenta) and imaged using MPF and SRS microscopy. The SRS images in 2930 cm$^{-1}$ and 2850 cm$^{-1}$ were unmixed to protein (cyan) and lipid (yellow) channels, respectively. FIG. 6C. The multiplexed images of mitochondria were deconvolved and converted to super-resolution images (magenta: Mito-Red; cyan: protein; yellow: lipid). FIG. 6D. The superimposed images show the resolution difference before and after deconvolution. The superimposed image before deconvolution (i). After deconvolution, the white area where the three components were overlapping was much reduced (ii). Panels (iii) and (iv) show the normalized signal intensity profiles before and after deconvolution. The three components show distinct spatial distribution after deconvolution as shown in the signal intensity profiles.

FIG. 7A. To compare different deconvolution methods, an artificial image composed of single pixel sized 9 dots was generated. The dots in the image have different intensity values. By convolution with an artificial PSF, a blurry image (Y) was generated. The image (Y) was deconvolved using a penalized regression method. FIG. 7B. When the objective function was minimized, the images, (X) results. Depending on the penalty parameter, R(X), X has various forms. The optimization result without any penalty parameter has strong ringing artifact as shown in panel (i), and the result with L2-norm penalty parameter has reduced ringing artifact as shown in panel (ii). By limiting summation of total intensity, the ringing artifact was reduced as shown in panel (iii). The penalty parameter limiting the total intensity as a fixed value makes the values in empty space to zeros. Accordingly, one of the main characteristics of A-PoD, the fixed total intensity of X, can increase sparsity of resulting images. FIG. 7C. Comparison of A-PoD with Richardson-Lucy method. When applying another characteristic of A-PoD, quantization of intensity value, together, the resulting image of A-PoD has higher resolution than that obtained using Richardson-Lucy method. The signal intensity profile shows the difference in resolutions. The dots in the A-PoD image have narrower width than Richardon-Lucy images. The calculation time of A-PoD was 1.9 s, and Deconvolutionlab2 using Richardson-Lucy algorithm calculated the image for 1.1 s (50 iteration) and 2.2 s (100 iteration).

FIG. 8A. To compare the localization microscopy image with A-PoD result, a mitochondrial image was deconvolved. The image stack is composed of 100 frames. Each image frame contains information about blinking emitters. The emitters were localized using SPIDER deconvolution algorithm. By averaging the image stack, a widefield image was generated, and the widefield image was deconvolved using A-PoD. The intensity profiles of the cross-section in the deconvolved images show the similarity between the two results. FIG. 8B. Two optimization methods for the deconvolution process were compared. An image composed of 100000 virtual emitters was deconvolved using the two different optimizers. The results of Adam solver (i) finished calculation within 2 s. By increasing the iteration number, the deconvolution results using genetic solver (ii, iii, and iv with different iteration numbers) were compared with the result of Adam solver. The deconvolution result with a high iteration number shows more precise image. However, to generate an image having same quality as that obtained with the Adam solver, the iteration number needs to be increased further beyond $5 \times 10^6$ more.

FIG. 9A. (i) A single "epifluorescence"-like image was calculated by averaging the STORM-stack. (ii) An area with low emitter density (yellow rectangle region in (i)) than other areas was selected. (iii) The averaged image stack of the chosen area was deconvolved using A-PoD. (iv) From the whole stack of the selected area, the individual single emitters were localized using DAOSTORM. FIG. 9B. The two areas marked by the blue and red rectangle areas in (i and ii) were selected. (iii and iv) The intensity profiles and auto-correlation data shows the periodicity of the structure of the membrane-associated periodic skeleton (MPS) in neurons. FIG. 9C. Another bright area with high emitter density (green rectangle area in i) where the individual molecules cannot be localized using DAOSTORM was selected. (i) From the image stack of the selected area, a single frame was chosen. (ii) Using A-PoD, the chosen frame was deconvolved. (iii and iv) The intensity profile and the auto-correlation result show the periodicity. Due to the strong intensity, the periodic structure was clearly revealed, and the interval in the MPS is also close to the previous published result, 190 nm[64].

FIG. 11A. Raw DO-SRS images of the HeLa cell. FIG. 11B. Deconvolution results of the images. The images show the shape and distribution of the lipid droplets in sub-micron scale. FIG. 11C. After measuring the surface area and volume of individual lipid droplets, the surface area to volume ratio of individual LDs was mapped.

FIG. 12A. In flies fed on different diets, LDs have different size distribution. In high glucose group, the LD size was widely distributed, and the number of LDs in 0.1~0.2 $\mu m^2$ range was higher than the other size. In control dietary condition, the control group with standard diet, the number of LDs in 0.2~0.3 $\mu m^2$ range was high. LDs were labeled on the images with three colors according to the size (Blue, 0.05~0.2 $\mu m^2$; Red, 0.2~0.3 $\mu m^2$; Green, 0.3~0.45 $\mu m^2$). FIG. 12B. To compare the LD size and lipid turnover rate, the two parameters of individual LDs were plotted. Under both conditions, LD size and lipid turnover rate show positive correlation. Correlation coefficient: 0.40 (3× glucose), 0.44 (control).

FIG. 13A. DO-SRS images of a drosophila larvae brain in 3× glucose group. The wide range new lipid (CD) and old lipid ($CH_2$) signal show the distribution of newly synthesized lipids and old lipids in whole sample, respectively. In the zoomed-in images, the microscopic distribution of two different lipid components is clearly shown. After deconvolution, the nanoscopic distribution and shape of lipid droplets are getting clearer. By using the particle analysis method, the background can be removed to focus on the areas of lipid droplets. FIG. 13B. SRS images of a drosophila larvae brain in the control group were processed with the same manner in FIG. 13A. These images were analyzed, and the analysis result is explained in FIG. 6.

FIG. 14A. USAF-1951 resolution target. The fluorescence image of the resolution target in the paper (65) was deconvolved using Richardson-Lucy algorithm (Deconvolutionlab2 program)[20]. FIG. 14B. Intensity profiles of the yellow dotted line in FIG. 14A show the resolution difference. A-PoD result resolved each line perfectly, but Richardson-Lucy result could not resolve them. FIG. 14C. Deconvolution results of retinal tissue image. The raw image (i) was deconvolved with Richardson-Lucy algorithm (ii) and A-PoD (iii). The image contrast was significantly improved when A-PoD was used for deconvolution.

DETAILED DESCRIPTION

Figures 1A, 1B, 1C:
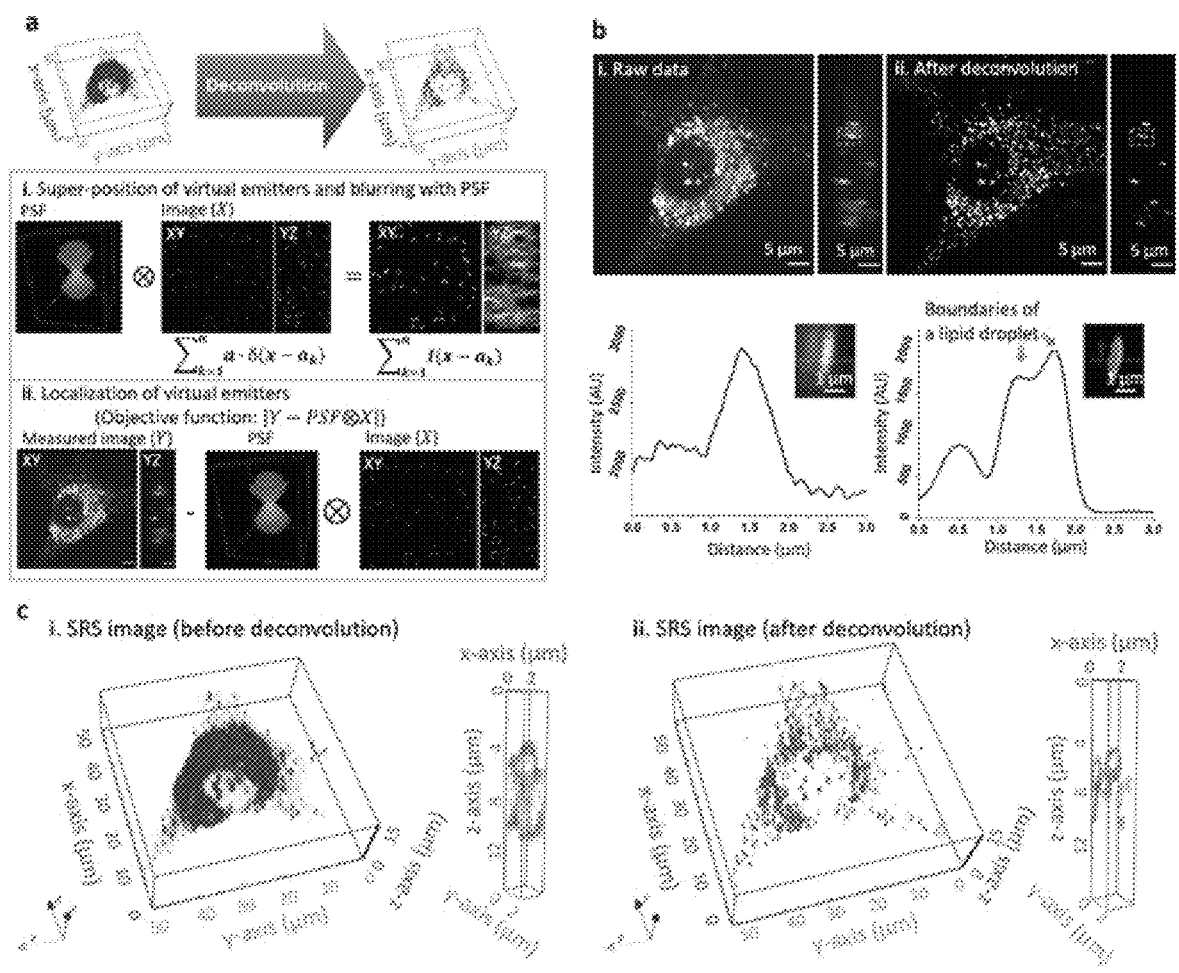
FIGS. 1A-1C. Deconvolution of SRS images using A-PoD.

All publications, patents, and patent applications mentioned in this specification are herein incorporated by reference to the same extent as if each individual publication, patent, or patent application was specifically and individually indicated to be incorporated by reference.

These and other embodiments and combinations of the embodiments will be apparent to one of ordinary skill in the art upon a review of the detailed description herein.

Unless defined otherwise, all terms of art, notations and other technical and scientific terms or terminology used herein are intended to have the same meaning as is commonly understood by one of ordinary skill in the art to which the claimed subject matter pertains. In some embodiments, terms with commonly understood meanings are defined herein for clarity and/or for ready reference, and the inclusion of such definitions herein should not necessarily be construed to represent a substantial difference over what is generally understood in the art.

As used herein, the terms "comprises," "comprising," "includes," "including," "has," "having," "contains", "containing," "characterized by," or any other variation thereof, are intended to encompass a non-exclusive inclusion, subject to any limitation explicitly indicated otherwise, of the recited components. For example, a composition, and/or a method that "comprises" a list of elements (e.g., components, features, or steps) is not necessarily limited to only those elements (or components or steps), but may include other elements (or components or steps) not expressly listed or inherent to the composition and/or method. Reference throughout this specification to "one embodiment," "an embodiment," "a particular embodiment," "a related embodiment," "a certain embodiment," "an additional embodiment," or "a further embodiment" or combinations thereof means that a particular feature, structure or characteristic described in connection with the embodiment is included in at least one embodiment of the present invention. Thus, the appearances of the foregoing phrases in various places throughout this specification are not necessarily all referring to the same embodiment. Furthermore, the particular features, structures, or characteristics may be combined in any suitable manner in one or more embodiments.

As used herein, the transitional phrases "consists of" and "consisting of" exclude any element, step, or component not specified. For example, "consists of" or "consisting of" used in a claim would limit the claim to the components, materials or steps specifically recited in the claim. When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define a composition and/or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of". It is understood that aspects and embodiments of the invention described herein include "consisting" and/or "consisting essentially of" aspects and embodiments.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

The term "and/or" when used in a list of two or more items, means that any one of the listed items can be employed by itself or in combination with any one or more of the listed items. For example, the expression "A and/or B" is intended to mean either or both of A and B, i.e. A alone, B alone or A and B in combination. The expression "A, B and/or C" is intended to mean A alone, B alone, C alone, A and B in combination, A and C in combination, B and C in combination or A, B, and C in combination.

Throughout this application, various embodiments may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The terms "quantifying" "determining," "measuring," "evaluating," "assessing," "assaying," and "analyzing" are often used interchangeably herein to refer to forms of measurement. The terms include determining if an element is present or not (for example, detection). These terms can include quantitative, qualitative or quantitative and qualitative determinations. Assessing can be relative or absolute. "Detecting the presence of" can include determining the amount of something present in addition to determining whether it is present or absent depending on the context.

As used herein, the term "about" a number refers to that number plus or minus 10% of that number. The term "about" a range refers to that range minus 10% of its lowest value and plus 10% of its greatest value.

The terms "subject," "patient" and "individual" are used interchangeably herein to refer to a vertebrate, preferably a mammal, more preferably a human. Tissues, cells, and their progeny of a biological entity obtained in vivo or cultured in vitro are also encompassed. A "subject," "patient" or "individual" as used herein, includes any animal. Suitable subjects (e.g., patients) include laboratory animals (such as mouse, rat, rabbit, or guinea pig), farm animals, and domestic animals or pets (such as a cat or dog). Non-human primates and, preferably, human patients, are included.

In embodiments, the disclosure provide methods of treatment of a disease or condition comprising administering to a subject in need thereof an effective amount of a treatment for the disease or condition resolved using a deconvolution method, including applying an A-PoD algorithm to an image, and generating a series of super-resolved images, as described herein.

As used herein, the terms "treat," "treatment," or "treating" embraces at least an amelioration of the symptoms associated with diseases in the patient, where amelioration is used in a broad sense to refer to at least a reduction in the magnitude of a parameter, e.g. a symptom associated with the disease or condition being treated. As such, "treatment" also includes situations where the disease, disorder, or pathological condition, or at least symptoms associated therewith, are completely inhibited (e.g. prevented from happening) or stopped (e.g. terminated) such that the patient no longer suffers from the condition, or at least the symptoms that characterize the condition.

As used herein, and unless otherwise specified, the terms "prevent," "preventing" and "prevention" refer to the prevention of the onset, recurrence or spread of a disease or disorder, or of one or more symptoms thereof. In certain embodiments, the terms refer to the treatment with or administration of a compound or dosage form provided herein, with or without one or more other additional active agent(s), prior to the onset of symptoms, particularly to subjects at risk of disease or disorders provided herein. The terms encompass the inhibition or reduction of a symptom of the particular disease. In certain embodiments, subjects with familial history of a disease are potential candidates for preventive regimens. In certain embodiments, subjects who have a history of recurring symptoms are also potential candidates for prevention. In this regard, the term "prevention" may be interchangeably used with the term "prophylactic treatment."

As used herein, and unless otherwise specified, a "prophylactically effective amount" of a compound is an amount sufficient to prevent a disease or disorder, or prevent its recurrence. A prophylactically effective amount of a compound means an amount of therapeutic agent, alone or in combination with one or more other agent(s), which provides a prophylactic benefit in the prevention of the disease. The term "prophylactically effective amount" can encompass an amount that improves overall prophylaxis or enhances the prophylactic efficacy of another prophylactic agent.

Various embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as, but not limited to, source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

A machine-readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, solid state devices (SSDs), and the like. The one or more memory devices (not shown) may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Disclosed herein is an A-Pod algorithm for quantitatively measuring the nanoscopic co-localization of biomolecules and metabolic dynamics in organelles. Newly synthesized lipids in lipid droplets were successfully differentiated using A-PoD coupled with DO-SRS. The A-PoD-enhanced DO-SRS imaging method was also applied to reveal the metabolic change in brain samples from Drosophila on different diets. This new approach enables quantitative measurements of the nanoscopic co-localization of biomolecules and metabolic dynamics in organelles. The A-PoD algorithm therefore can have a wide range of applications, from nano-scale measurements of biomolecules to processing astronomical images.

For example, unlike traditionally-mapped Raman imaging, stimulated Raman scattering (SRS) imaging achieved the capability of imaging metabolic dynamics and a greatly improved signal-noise-ratio. However, its spatial resolution is still limited by the numerical aperture or scattering cross-section. To achieve super-resolved SRS imaging, Adam optimization-based Pointillism Deconvolution (A-PoD) was developed for SRS imaging, and demonstrated a spatial resolution of 52 nm on polystyrene beads. By changing the genetic algorithm to A-PoD, the image deconvolution process was shortened by more than 3 orders of magnitude, from a few hours to a few seconds. By applying A-PoD to spatially correlated multi-photon fluorescence (MPF) imaging and deuterium oxide ($D_2O$)-probed SRS (DO-SRS) imaging data from diverse samples, nanoscopic distributions of proteins and lipids were compared in cells and subcellular organelles. The A-PoD-enhanced DO-SRS imaging method was also applied to reveal the metabolic change in brain samples from Drosophila on different diets. This new approach enables quantitative measurements of the nanoscopic co-localization of biomolecules and metabolic dynamics in organelles.

A-PoD utilizes and Adaptive Moment Estimation (Adam) solver instead of a genetic algorithm for optimization process to significantly enhance the data processing speed and precision of SUPPOSe. The gradient descent algorithm, Adam, removes the randomness in the genetic algorithm and enables enhanced spatial precision and shortened data processing time. A-PoD was applied to SRS imaging, and a series of super-resolved images of mammalian cells and tissues were generated, as well as Drosophila brain tissues. These images displayed nanoscopic distributions of proteins and lipids in biological samples. The shapes and sizes of individual lipid droplets (LDs) were also measured in Drosophila brain samples and the effects of high glucose diet on brain lipid metabolism and the size distribution of LDs was examined.

Here, an A-PoD algorithm has been developed and integrated with SRS, DO-SRS, and MPF-SRS imaging methods. A-PoD significantly enhances the spatial resolution of images at a high processing speed and spatial accuracy when an appropriate PSF is defined, regardless of the imaging modalities. A-PoD can be applied not only to widefield fluorescence microscopy[24] but also to various other microscopy techniques. The super-resolution A-PoD-coupled SRS microscopy introduced here also has broad applications including deep-tissue imaging, hyperspectral imaging, and multiplex imaging[49-52].

Figures 7A, 7B, 7C:
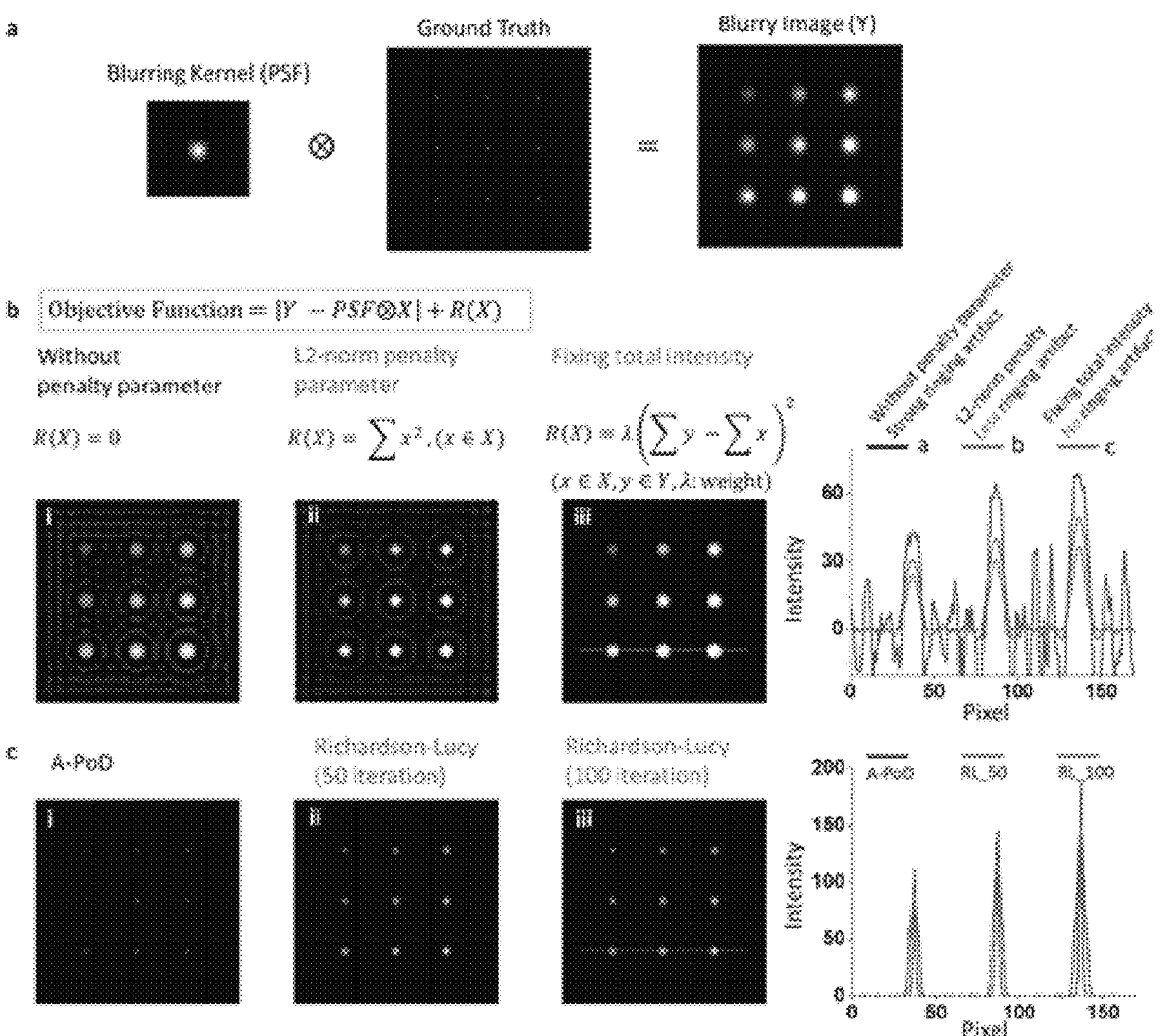
FIGS. 7A-7C. Comparison of A-PoD with Richardson-Lucy method using simulation data.
Figures 8A, 8B:
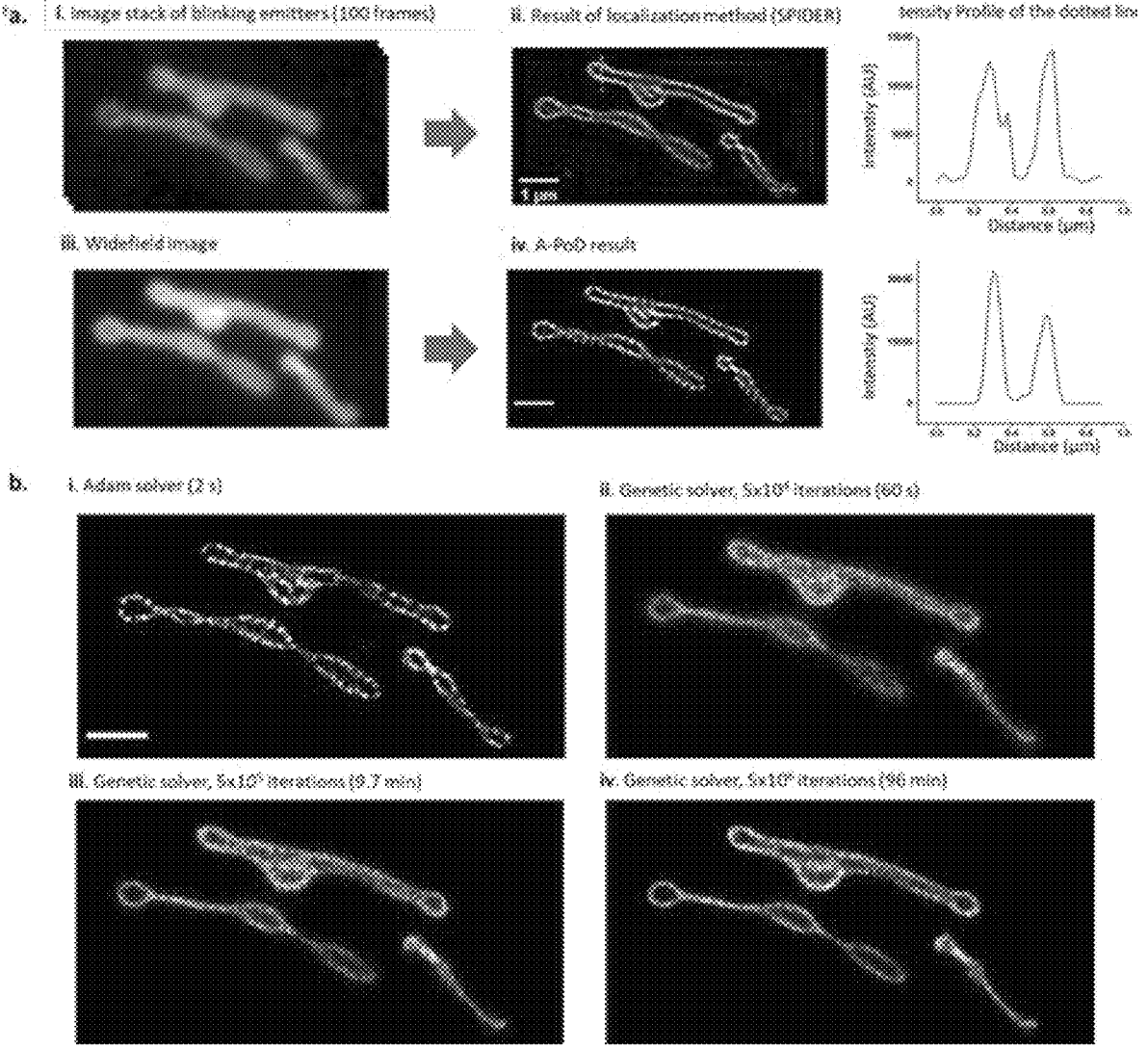
FIGS. 8A-8B. Precision and speed of A-PoD in comparison with SPIDER.

A-PoD was first characterized as a sparse deconvolution method by analyzing simulated data. The capability of A-PoD to generate super-resolved image was evaluated by comparison with localization microscopy data (FIG. 8A). Although the genetic algorithm in SUPPOSe is good to optimize variables in an integer domain (e.g., the address of specific pixels), it contains randomness in the process. Gradient values of the function need to be calculated in every optimization step, which is time consuming. By changing the genetic algorithm to A-PoD, the image deconvolution process was shortened by more than 3 orders of magnitude, from a few hours to a few seconds (FIG. 8B). Compared with the Richardson-Lucy algorithm (FIG. 7C, FIGS. 14A-14C), the most widely used deconvolution method, A-PoD offers much richer chemical information at a high resolution.

For analysis of STORM imaging data (FIGS. 9A-9C), A-PoD demonstrated the potential as an image processing tool for localization microscopy. Generally, in order to achieve a super-resolved image using STORM, a low concentration of emitters must be kept. In contrast, for A-PoD, strong signals are desirable to achieve a higher resolution. Due to this unique characteristic of A-PoD, the periodic structure of the membrane-associated periodic skeleton could be clearly visualized in neurons from a single image in the bright ROI. This finding implies that A-PoD significantly improves the temporal resolution of localization microscopy, allowing extraction of image features from single to a few frames rather than analyzing tens of thousands of image frames. Depending on the imaging rate of the image stack, it would be possible to take a super-resolved image in a few micro-second ranges when enough emitter density is secured.

Using A-PoD-coupled SRS microscopy, the distributions of proteins and lipids in cultured cells and tissue samples were successfully examined at the nanoscopic level. The nanoscopic distribution of LDs in cancer cells and the membranous outer segments of rod cells in the retinal tissue were clearly resolved. Furthermore, integration of A-PoD into the DO-SRS platform enabled examination of different distributions of newly synthesized lipids as compared to the pre-existing lipids in live cells and tissues. This combination provides a powerful tool for direct visualization of lipid metabolic changes not only in cells but also in brain tissues (FIGS. 4A-5E).

Using the cultured HeLa cells and the breast cancer cells, the power of A-PoD-coupled SRS imaging was shown in examining subcellular organelles, such as LDs and mitochondria (FIGS. 3A-4E, FIGS. 6A-6D). For example, the SA:V ratio of individual LDs was mapped. Since the accuracy of the measured surface area and volume depends on the spatial resolution of images, A-PoD is a valuable tool for analyzing the exact values of these parameters. Using A-PoD-based DO-SRS, the spatial distribution of distinct subpopulations of LDs was examined. The subpopulations included those predominantly containing newly synthesized lipids, those mostly containing old lipids, and LDs containing mixed lipids. Mapping the old and new lipid domains in individual LDs (FIG. 5E) provides useful information in studying lipid metabolism at the nanoscale. Future experiments are necessary for understanding the pathophysiological roles of LD heterogeneity. Nevertheless, the A-PoD-based DO-SRS imaging system provides a robust method for studying molecular heterogeneity in living organisms.

Analyses of the LD size distribution and lipid turnover rate in Drosophila brain samples indicate that the subpopulation of LDs with higher turnover rate increased in the brain in flies on a high glucose diet and that average lipid turnover rate in the high glucose group was much higher than the control group. It suggests that smaller LDs, which are usually referred to the newly born LDs connected endoplasmic reticulum (ER)[53], may have lower de novo lipid synthesis ability. They may obtain lipid content directly from ER lumen. This is consistent with previous works[54] reporting that enzyme-mediated (e.g., DGAT2-mediated or CCT1-mediated) de novo lipid synthesis were mainly localized in the larger mature LDs detached from ER. Here, the A-PoD enhanced super-resolution DO-SRS imaging has revealed the metabolic diversity of LDs, which had never been reported by using other methods. Previous studies reported that the ER stress was induced by high glucose[55], and that ER stress increased the LD number[56,57]. However, the A-PoD-based DO-SRS imaging system provides an effective tool for future studies on dynamics changes in LDs, functional roles of LDs and underlying mechanisms under various physiological and pathological conditions.

Figures 6A, 6B, 6C, 6D:
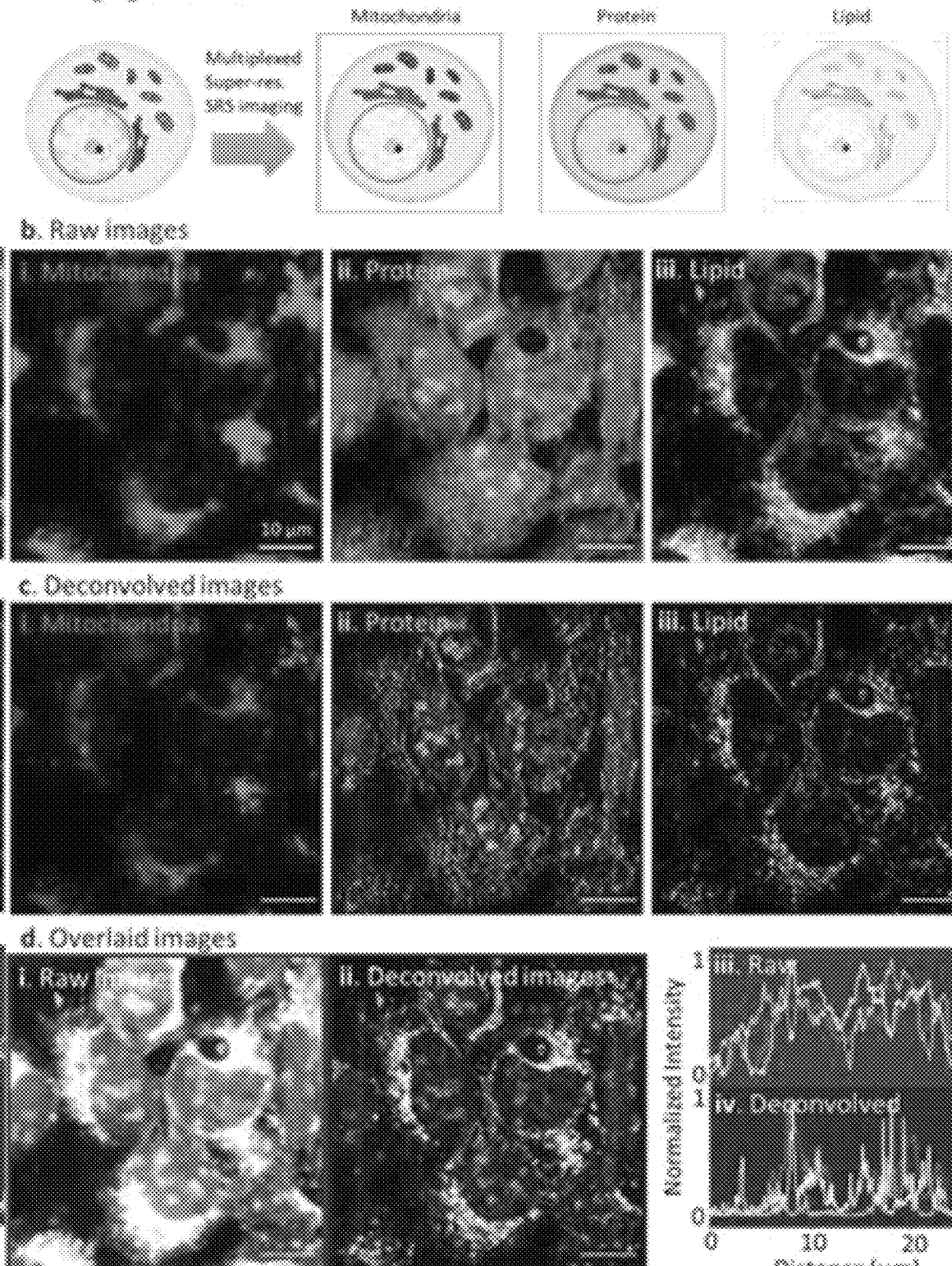
FIGS. 6A-6D. Multiplexed super-resolution DO-SRS imaging of mitochondria.

To define nanoscopic distribution of different molecules, A-PoD can be utilized in multiplex SRS imaging. For example, HEK293 cells stably expressing Mito-Red were prepared, and subcellular distribution of mitochondria, proteins, and lipids were examined using A-PoD based MPF and SRS imaging. As expected, the majority of Mito-Red signals overlap with $CH_2$ lipid (membrane) signals (FIG. 6D). By comparing the spatial localization of different components, co-localized and non-overlapping components can be clearly defined. Furthermore, A-PoD coupled multiplex SRS can be applied to imaging other biomolecules such as nucleic acids.

Recently, various super-resolution techniques have been applied to SRS imaging[11,12,61,62]. Nonetheless, the localization method for super-resolution fluorescence microscopy was considered not applicable to Raman imaging. Due to the lack of single-molecule detection capability and the high emitter density, it is challenging to localize every single molecule in Raman image. However, A-PoD overcomes this limit by the localization process of virtual molecules. The potential application of A-PoD in new localization microscopy methods was demonstrated in the analyses of STORM images. For the existing localization microscopy methods, the amount of emitter signals has to be precisely adjusted. To make this adjustment, one needs to take numerous different frames to reconstruct a single super-resolved image. However, A-PoD can maximize the temporal resolution by overcoming the limitation of emitter density. Therefore, this program is capable of not only taking a super-resolution SRS image but also a super-resolution fluorescence image at a high speed.

A-PoD has a wide range of applications. For example, as disclosed herein, A-PoD with STORM or DO-SRS or multiplex MPF-SRS. It is also applicable to other imaging techniques, in which blurring kernel can be defined. For example, in the case of atomic force microscopy, the PSF model of optical microscopy cannot be applied because the morphology of the sample is measured by force between the tip end and the sample. However, the tip convolution effect blurs images due to the shape of the tip end. Tip deconvolution has been attempted[58], but these attempts have yet to improve the quality of the AFM image, whereas A-PoD can be applied as a solution for enhancement.

In addition, the resolution of super-resolved images can be further improved by using A-PoD. Structured illumination microscopy (SIM), one of the super-resolution imaging techniques, is an example. Although SIM improves spatial resolution[59,60] over two folds by reducing the size of the PSF, the resolution of SIM images can be further increased using A-PoD, because deconvolution is also possible based on the reduced PSF. This approach has also been applied using a different deconvolution program, Sparse-SIM[61]. Finally, A-PoD can be applied to astronomy[62], which is a research field where deconvolution is widely used. In fact, the Richardson-Lucy algorithm was originally published for astronomy studies[63]. A-PoD therefore may have many different applications from the nano-scale to the astronomic scale.

EXAMPLES

Image Processing

Image Pre-Processing

The image of the 1 µm bead was interpolated twice along the optical axis direction, and the retina image was interpolated six times in all directions. The 3D live cell images were interpolated ten times along the optical axis direction. The measured DO-SRS images were resampled before deconvolution. For all resampling process, Fourier interpolation code f-SOFI was used[66]. In order to increase the signal-to-noise ratio, the PURE denoise filter was used ten times to reduce noise in an imaging standard bead, and automatic correction of sCMOS-related noise (ACsN) algorithm, and ACsN was used for the retina image[67,68].

A-PoD Algorithm

The A-PoD algorithm was newly implemented for SRS analysis. A-PoD was developed using Adam solver. Application of Adam solver on the Pointillism deconvolution algorithm is the first approach to use gradient algorithm. It shows capability of various gradient descent algorithm applications. Therefore, A-PoD covers the whole possibilities of gradient descent algorithm-based Pointillism deconvolution approaches.

In localization microscopy the broad background signal can be an obstacle to localizing each single emitter. Using spline[74], the background may be selectively removed. Since A-PoD is also based on localization process, broad background signal removal can be an additional approach to make the results preciser. To remove broad background signal, Fourier filtering can also be applied.

In A-PoD, a proper number of virtual emitters are set. Based on variance and mean value of intensities, the parameter automatically can be calculated. A proportional constant to manually control the parameter when one adjusts it.

A-Pod can be applied to multiple types of imaging systems and imaging analysis, if one can define PSF of the setup. For example, this method is applicable not only for the super-resolution microscopy, but also for the diffraction limited widefield microscopy. Deconvolution approach can be applied for phase contrast microscopy based on optical transfer function. Therefore, A-PoD can be applied to enhance spatial resolution of phase contrast microscopy images. For other imaging techniques like infrared (IR) and photoacoustic imaging including telescopes, after defining PSFs, spatial resolutions can be enhanced using A-PoD.

Figure 15:
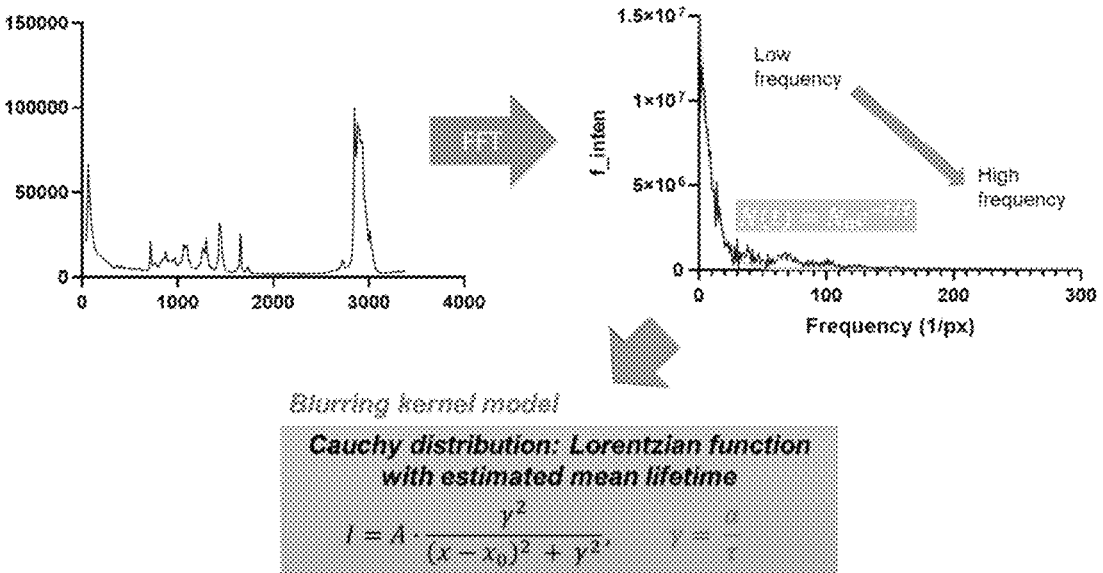
FIG. 15. Fourier Transformation. After Fast-Fourier Transformation of a spectrum, using a mean lifetime model, describable spatial information ranges can be estimated. From the estimated results, the size of a Lorentzian function can be set, blurring kernel in spectra.
Figure 16:
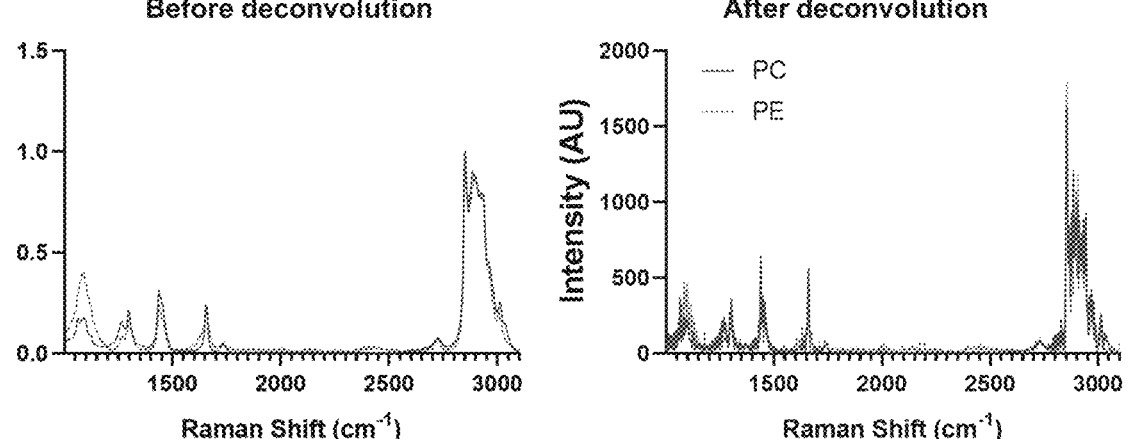
FIG. 16. Blind deconvolution results. Using the estimated blurring kernel information, spectra of two lipid subtypes were deconvolved.

In the cases that one cannot define PSF, one can also apply A-PoD to improve resolutions Like general blind deconvolution methods, using statistical approaches, for example, maximum likelihood approximation, iteratively estimate PSF. The estimated PSF can be utilized for A-PoD. In addition, from the Fourier domain information of images, PSF model can be estimated as shown in FIGS. 15-16. For spectral deconvolution, one should assume that broadening pattern follows Lorentzian function. By converting the Lorentzian function to the function in Fourier domain and fitting the function with a proportional constant, one can define blurring kernel of the spectra. The deconvolution results show clear information Like this example, using this blind A-PoD approach, one can deconvolve spectra of every type of spectrometer. In addition, for imaging techniques that is hard to define their PSF models, this blind deconvolution method can be applied to. For example, for MRI, CT, and AFM, the blind deconvolution method with A-PoD can improve spatial resolution.

The Adam solver[71] was adopted as the optimization method and used a gradient algorithm instead of genetic algorithm. The optimization method was changed to a gradient descent algorithm from genetic algorithm. The optimization method used is the Adam solver[69]. Because the variables of A-PoD are positions of each virtual emitters, the numbers are set to the address value of the pixel. Therefore, all of these numbers have integer values, and for this, the gradient equation of the Adam solver was modified as follows:

$$\nabla\Phi = \frac{\Phi(x_n+1, y_n, z_n) - \Phi(x_n-1, y_n, z_n)}{(x_n+1)-(x_n-1)},$$

$$\frac{\Phi(x_n, y_n+1, z_n) - \Phi(x_n, y_n+1, z_n)}{(y_n+1)-(y_n-1)}, \frac{\Phi(x_n, y_n, z_n+1) - \Phi(x_n, y_n, z_{n+1})}{(z_n+1)-(z_n-1)}$$

Here, $\Phi$ is an objective function for deconvolution of 3D image.

PSFs for deconvolution processes were simulated using the PSF generator in ImageJ plugin according to the physical conditions of each measurement[20,70]. In order to efficiently process a 3D image, the image was deconvolved by dividing the image into several pieces as used in the SPIDER algorithm[23]. A-PoD was implemented using Tensorflow 1.15 and Python 3.6. The number of virtual emitters used was manually controlled under the condition that the image contrast improved. All calculations were performed on a Xeon W-2145 CPU, 64 GB RAM, and NVIDIA Quadro P4000 GPU.

Lipid Droplet Analysis

After deconvolution, individual lipid droplets were counted with 3D objects counter in ImageJ. Based on the information of position, volume, surface area, and mean-distance, the plots in FIGS. 3A-3F, FIGS. 6A-6D, and FIGS. 11A-12B were prepared. After detection of individual lipid droplets, the surface area to volume ratio was mapped using Matlab.

Sample Preparation

Standard Beads

Colloid suspension of 270 nm diameter polystyrene beads with a solid content of 1.0 wt. % (ThermoScientific) was used in the following experiments. To tailor the suspension for the CAPA experiments, the colloidal solution was further diluted 10-fold to a 0.1 wt. % concentration (9.33×1010 part/ml) using deionized water.

Retinal Section Preparation

Human retina tissue sections were obtained from a donor (age 83) (San Diego Eye Bank, CA, USA) with appropriate consent from the San Diego Eye bank and following a protocol approved by the University of California, San Diego Human Research Protection Program. The donor had no history of eye disease, diabetes, or any neurological diseases. Following fixation, the retina was process for cryostat sections (12 µm) and stored at −80° C.

Frozen sections were defrosted (10 min, RT) and washed with 1× PBS 3 times, for 10 mins each time and then sandwiched between a 170 nm coverslip and a glass slide with PBS solution. The coverslips were sealed with nail polish.

MCF-7 Breast Cancer Cell

MCF-7 cells were cultured in DMEM growth media supplemented with 10 mg/L insulin (Sigma Aldrich, St. Louis, MO), 1% v/v Penicillin-Streptomycin mix (Fisher Scientific, Waltham, MA), and 5% v/v heat inactivated FBS on #1 thickness cover-glass (GG12-Laminin, Neuvitro) for 48 hrs. Cells were fixed with 4% v/v PFA solution for 15 mins and then mounted on 1 mm thick glass slides.

HEK293 Cells

HEK293 cells were stably transfected with a plasmid expressing monomeric red fluorescent protein containing a mitochondrial targeting sequence (Mito-Red)[71]. Cells were cultured on coverglasses in 24 well cell culture dishes at 37° C. (5% $CO_2$) in DMEM supplemented with 10% fetal bovine serum (FBS; Atlanta Biological) and 1% penicillin/ streptomycin (Fisher Scientific). Cells were fixed with 4% paraformaldehyde (PFA) in PBS. Following washes with PBS, the coverglasses were mounted in PBS before imaging.

HeLa Cell

HeLa cells were cultured in Dulbecco's modified Eagles' medium (DMEM), supplemented with 10% fetal bovine serum (FBS) and 1% penicillin/streptomycin (Fisher Scientific, Waltham, MA), and incubated with 5% $CO_2$ at 37° C. After passaging at 80% confluence, cells were seeded at a concentration of $2\times10^5$/mL onto coverglass in a 24-well plate. DMEM with 0.5% FBS and 1% penicillin/streptomycin was used to synchronize the cells for 8 hours. The media was then changed to 50% (v/v) heavy water ($D_2O$) and treatment media as described below.

For the excess aromatic amino acids condition, phenylalanine and tryptophan were increased as two separate test conditions at a 15× concentration. L-phenylalanine powder (SLCF3873, Sigma Aldrich) and L-tryptophan powder (SLCF2559, Sigma Aldrich) were added to DMEM for the excess groups. Cells were then cultured for 36 hours. Next, the cells were gently rinsed with 1× PBS with Calcium and Magnesium ions at 37° C. (Fisher Scientific, 14040216), and fixed in 4% methanol-free PFA solution (VWR, 15713-S) for 15 minutes. The cover glass was finally mounted on the cleaned 1 mm thick glass microscope slides with 120 μm spacers filled with 1× PBS for imaging and spectroscopy. These samples are stored at 4° C. when not in use.

Drosophila

The w[1118] parent flies were raised in vials containing the standard food (Bloomington cornmeal-yeast-sugar recipe) at 25° C. in a controlled light (12/12-h light/dark cycle) and humidity (>70%) environment for several generations. The embryos from the young females (~7 day aged) were collected in a 4 h window to synchronize larval development. Two groups of 10-15 1st instar larvae were put into vials containing 20% $D_2O$ labeled standard food (100 g yeast, 50 g sucrose, 5 g agar per liter) and 3× high glucose food (100 g yeast, 150 g sucrose, 5 g agar per liter), respectively. The larvae were allowed to develop until wandering 3rd instar and then brains were dissected in PBS and fixed in 4% formaldehyde for 21 min at room temperature (RT). After fixation, brains were washed four times with PBS in glass wells and were then sandwiched between a coverglass and the slide with PBS solution. To prevent the tissue drying, nail polish was used to seal the surrounding of the cover glass.

Image Collection

STORM Imaging

The mouse hippocampal neuronal culture and immunostaining were performed according to known methods[64]. The STORM imaging[72] was performed on a custom inverted microscope (Applied Scientific Imaging) with a 60× Nikon objective (MRD01605). A custom Lumencor Celesta system was used to illuminate the sample. An ~1 W 640 nm laser line was used to image a hippocampal neuron immunostained using anto-beta II spectrin antibody conjugated to the Alexa-647 dyes conjugated to the spectrin antibody and a ~200 mW 405 laser line was used to stimulate the cycling of the dyes. The Teledyne Kinetix camera was used to for imaging at 50 Hz.

The other imaging conditions and the parameters for the DAOSTORM fitting and processing were set according to known methods[73]. The neuron culture was also performed according to known methods[64].

SRS Microscopy

A custom-built upright laser-scanning microscope (Olympus) with a 25× water objective (XLPLN, WMP2, 1.05 NA, Olympus) was applied for near-IR throughput. Synchronized pulsed pump beam (tunable 720-990 nm wavelength, 5-6 ps pulse width, and 80 MHz repetition rate) and Stokes (wavelength at 1032 nm, 6 ps pulse width, and 80 MHz repetition rate) were supplied by a picoEmerald system (Applied Physics & Electronics) and coupled into the microscope. The pump and Stokes beams were collected in transmission by a high NA oil condenser (1.4 NA). A high O.D. shortpass filter (950 nm, Thorlabs) was used that would completely block the Stokes beam and transmit the pump beam only onto a Si photodiode for detecting the stimulated Raman loss signal. The output current from the photodiode was terminated, filtered, and demodulated by a lock-in amplifier at 20 MHz. The demodulated signal was fed into the FV3000 software module FV-OSR (Olympus) to form image during laser scanning. All images obtained were 512×512 pixels, with a dwell time 800 and imaging speed of ~23 s per image.

Fluorescence Microscopy

Multiphoton fluorescence microscopy is integrated with the DIY SRS microscopy together for imaging the same region of interest with different modalities (DO-SRS signals and fluorescence signals). Mitored signal was imaged with 800 nm ultrafast laser scanning two photon fluorescence excitation and detected by PMT with a 610 nm band pass filter in front of it.

A-PoD (Adam Optimization-Based Pointillism Deconvolution)

SRS were images into super-resolution images using a procedure illustrated in FIG. 1A. First, a specific number of virtual emitters proportional to the overall brightness of the image are placed on an image (X), and a blurred image (S) is created through convolution of X and the PSF. When the position of each virtual emitter is adjusted such that the difference between the blurred image S and the measured image (Y) is minimized, X becomes the image with the most optimal distribution of virtual emitters. A modified Adam solver[71] was used for the optimization in A-PoD. Using simulation image data, A-PoD was compared with Deconvolutionlab2 using the Richardson-Lucy method, a widely used deconvolution algorithm. A-PoD outperformed Deconvolutionlab2 using Richardson-Lucy algorithm (even with 100 iterations) (FIGS. 7A-7C).

As a proof of concept, A-PoD was applied to SRS imaging of lipids (at ~2850 cm$^{-1}$) in a live cell. Application of A-PoD greatly improved spatial resolution (FIG. 1B). The increased spatial resolution clearly revealed individual lipid droplets (LDs) inside the cell, distinguishing the membrane and the internal space of the LD. The three-dimensional sizes of individual LDs can also be clearly visualized from the sharpened image (FIG. 1C).

To assess the precision of A-PoD, the localization results were compared with those obtained using SPIDER[23]. A raw mitochondrial image stack was used in the previous SPIDER publication[23] that was composed of 100 frames. Each image frame contained information of scattered blinking emitters. The image stack was processed with SPIDER program. The widefield image was generated by averaging the stack and was deconvolved using A-PoD. Image processing using A-PoD revealed the mitochondrial structure similar to that obtained using SPIDER (FIG. 8A). Cross-section signal intensity profiles of images showed that the thickness of the mitochondrial membrane measured by the two methods was almost same. These results demonstrate that A-PoD can reconstruct a super-resolved image from a single frame widefield image. To test the processing speed of A-PoD, the mitochondrial image was deconvolved with limited virtual emitter numbers of $10^5$. As iteration number increased, the similarity between the ground-truth image and the deconvolution image was increased (FIG. 8B). Using A-PoD, the entire process was completed in 2 seconds, and the similarity was higher than that using genetic algorithm that took 96 minutes with $5 \times 10^6$ iterations. By further increasing the number of iterations, the genetic algorithm could improve the similarity but with a longer processing time.

STORM Image Analysis

Figures 9A, 9B, 9C:
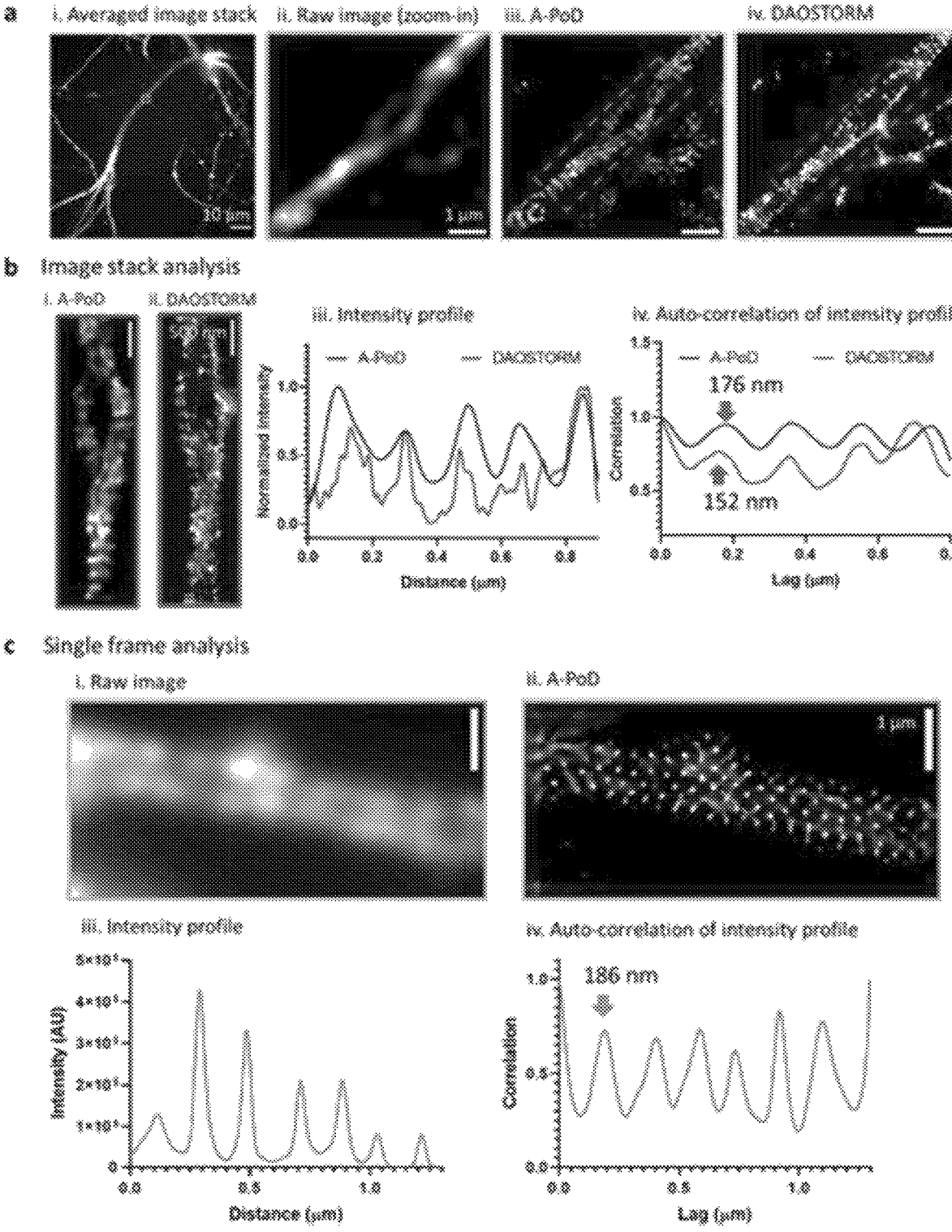
FIGS. 9A-9C. Comparison of the deconvolution results on STORM images using DAO STORM[26] versus A-PoD.

To evaluate the spatial precision of deconvolution, A-PoD results were compared with DAOSTORM[26], a widely used algorithm to localize emitters in super-resolution imaging methods such as STORM (FIGS. 9A-9C). For this comparison, an image of cultured neurons where spectrin was labeled using a fluorescent antibody (mouse anti-βII spectrin antibody conjugated with Alexa647) was analyzed using the two algorithms. The original STORM image stack was composed of 16500 frames, and two regions of interest (ROIs) with different emitter densities were analyzed (FIGS. 9B-9C). One of the selected ROIs contained a low emitter density. From the entire image stack of the selected ROI, "epifluorescence"-like image was calculated. The image was deconvolved using A-PoD.

Due to the low density of emitters, individual molecules in the image frame could be localized using DAOSTORM. Analysis using either A-PoD or DAOSTORM revealed the periodic structure of the membrane-associated periodic skeleton (MPS) in neurons. The intensity profile and the auto-correlation curves (FIG. 9B) showed the periodicity quantitatively, and the periodicity obtained using A-PoD was close to that obtained using DAOSTORM with less than 20% of error. From another ROI containing a high emitter density (FIG. 9A), a single frame was analyzed from the image stack using A-PoD (FIG. 9C). Interestingly, the periodic structure of the MPS becomes more clearly visible than the other ROI with lower emitter density (FIG. 9C). Therefore, A-PoD can be used to analyze images with similar performance as DAOSTORM at low emitter density. A-PoD can be applied to processing images with a wider range of emitter densities.

Standard Sample Measurement

Figure 10:
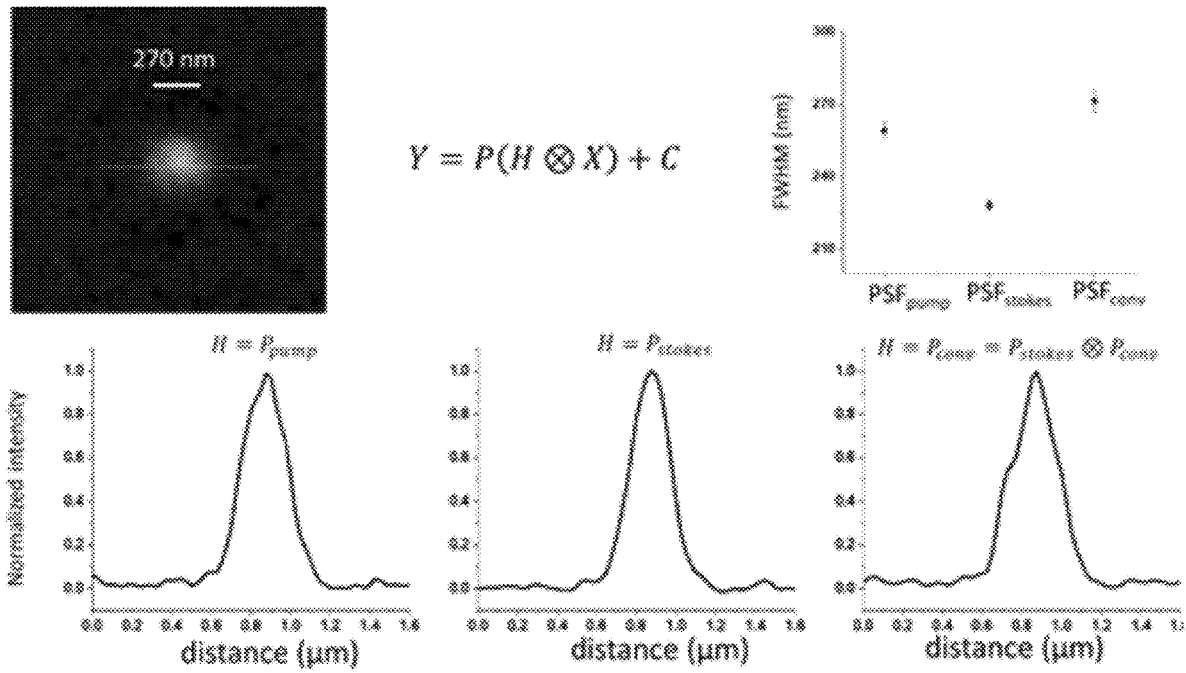
FIG. 10. Comparison of three PSF models. The bead image of 270 nm size was deconvolved using different PSF models. To compare the accuracy of the results, the FWHM of the fitted Gaussian functions were compared. When $PSF_{conv}$ was used, FWHM was almost same with the bead size.
Figures 11A, 11B, 11C:
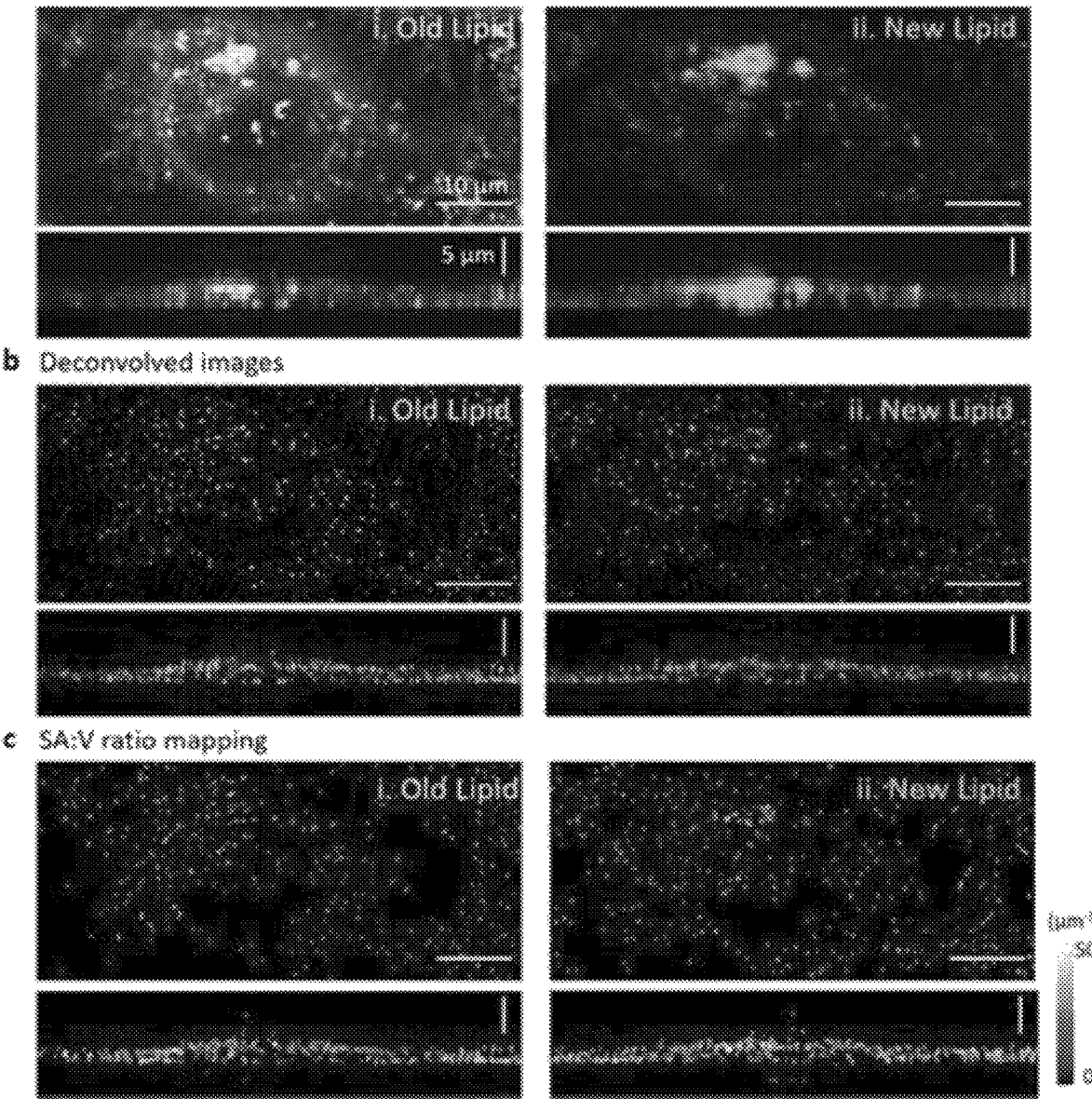
FIGS. 11A-11C. SRS images of a HeLa cell cultured in the standard medium.

To quantitatively determine the resolution of A-PoD coupled SRS imaging, images of standard polystyrene beads with known sizes (270 nm and 1 μm, respectively) were first analyzed. The measured image Y was reproduced through convolution of the PSF and the virtual image X. For precise deconvolution, accurate prediction of PSF is critical. The results of using PSFs determined by the pump beam ($PSF_{pump}$), the Stokes beam ($PSF_{Stokes}$), and the convolution of $PSF_{pump}$ and $PSF_{Stokes}$ ($PSF_{conv} \otimes PSF_{pump} \otimes PSF_{Stokes}$), respectively, were evaluated. After deconvolution of a 2D image of 270 nm beads and using the decorrelation analysis[25], the same spatial resolution of 52 nm was obtained from all these three approaches, but with different full width half maximum (FWHM) values (FIG. 2A, FIG. 10).

Using $PSF_{conv}$ reproduced the most accurate bead size, while $PSF_{pump}$ and $PSF_{Stokes}$ showed results approximately 10-20% smaller than the actual size. Therefore, the image of 1 μm beads was analyzed using the $PSF_{conv}$. After deconvolution, the lateral size of the bead was expressed close to 1 μm, but the axial size of the bead was approximately 2.5 times larger. Since the focal volume of a Gaussian beam has a longer shape along the vertical axis[27], the axial resolution is worse than the lateral resolution. Additionally, a cone-shaped afterimage appearing along the optical axis was observed. This is because the direction and intensity of scattering are affected by the size and material of an object, and this scattering behavior is reflected in the shape of the wavefront of light[28,29]. The wavefront of light is distorted by scattering and diffraction. It is difficult to predict using an ideal PSF model. Therefore, the distortion near the bead was not removed by deconvolution. However, this can be mitigated by the combination of adaptive optics and a deep learning method that learns PSF changes around an object[30, 31].

Human Retinal Tissue Imaging

Next, A-PoD was extended to SRS imaging of human retinal tissue samples (FIG. 2B). The outer segments of photoreceptors were focused on, which contain membranous photoreceptor discs surrounded by the cell membrane. After applying A-PoD to the SRS image, the image resolution was markedly increased, allowing for improved structural discrimination. For instance, the cell membrane could be visually distinguished in the outer segment of rod cells. The thickness of the cell membrane was about 170 nm, and the resolution of the entire image calculated using the decorrelation analysis method 32 was approximately 100 nm. This resolution with the retinal sample image is lower than the standard bead image, because the deconvolution accuracy depends on the imaging conditions, including the intensity and sampling frequency. The bead image was measured with a sampling rate of 26 nm/px, but the sampling rate of the retinal image was 198 nm/px. Although the increase in spatial resolution was not sufficient to resolve the actual membrane thickness of 4~5 nm, considering the wavelengths of the laser beams and the characteristics of the PSF, the resolution of ~100 nm clearly exceeded the diffraction limit. It is known that the lipid composition of rod cell membrane is significantly different from the photoreceptor discs[33]. The A-PoD coupled SRS microscopy demonstrated a remarkable ability to distinguish these compartments.

Lipid Droplet (LD) Imaging

Lipid droplets are organelles important for cell proliferation and survival. These ubiquitous organelles not only serve as energy stores, but also play crucial roles in cell signaling and membrane trafficking. They also contain diverse spatial and chemical information that may reflect oxidative stress, metabolic flux, and disease status[34,44]. However, it has been challenging to direct visualize LD metabolism at the organelle level, mainly due to a lack of spatial information in conventional lipidomic modalities. Using A-PoD-coupled DO-SRS imaging, the nanoscopic distribution of LDs and their metabolic activities were visualized. DO-SRS imaging (at 2850 cm$^{-1}$) clearly revealed numerous LDs in the breast cancer cell, and the size of individual LDs could be precisely measured after deconvolution (FIG. 1C, FIG. 2C). The membrane of each LD was visually separated from the inner space of LD. The thickness of the LD membrane was measured to be approximately 200 nm. This size was similar to the previously measured cell membrane of the rod cells. The axial thickness of the LD was approximately 500 nm, about 2.5 times larger than the lateral resolution. This difference is comparable to the resolution difference in the 1-μm bead imaging.

Figures 3A, 3B, 3C, 3D, 3E, 3F:
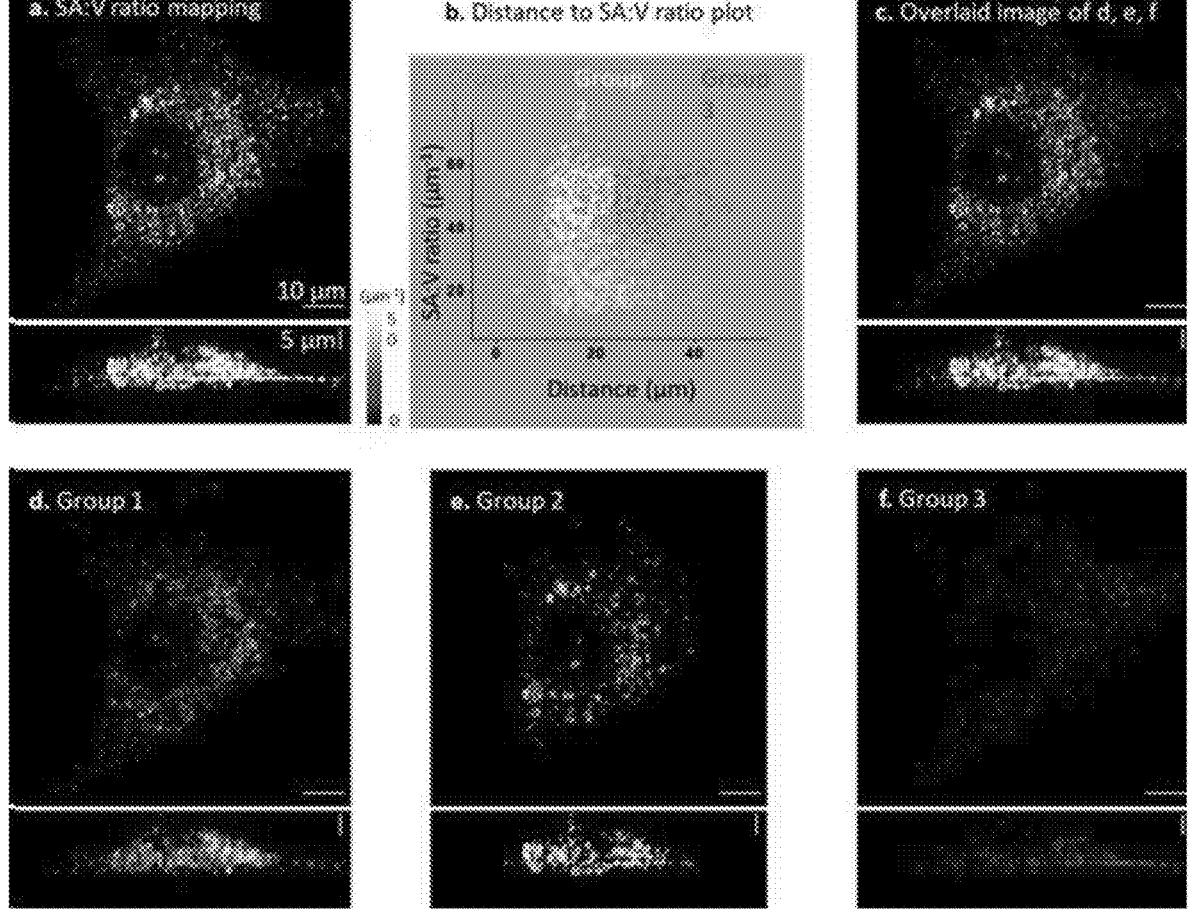
FIGS. 3A-3F. Surface area (SA): Volume (V) ratio analysis.

Next, a particle analysis method was used to remove the background and to focus on the regions of lipid droplets. The subcellular distribution of LDs in the breast cancer cells was then analyzed (FIGS. 3A-3F). The distances of the detected particles were measured from an arbitrarily chosen point near the center of the nucleus, and calculated the surface area:volume (SA:V) ratio of individual LDs. The LDs were classified into 3 groups based on the distance and SA:V ratio using k-mean algorithm (FIG. 3B). Group 1 had lower SA:V ratio than the other 2 groups (FIG. 3D). The LDs in group 2 (FIG. 3E) were distributed more closely to the nucleus than those in group 3 (FIG. 3F). The capability of A-PoD coupled DO-SRS to identify these different subpopulations of LDs with different SA:V ratio or subcellular distribution may facilitate future studies of dynamic interactions of LDs with other organelles (such as ER), as previous studies suggested that nano-LDs newly detached from ER have high SA:V ratio[76].

Nanoscopic Metabolic Imaging with Super-Resolved DO-SRS.

Figures 4A, 4B, 4C, 4D, 4E:
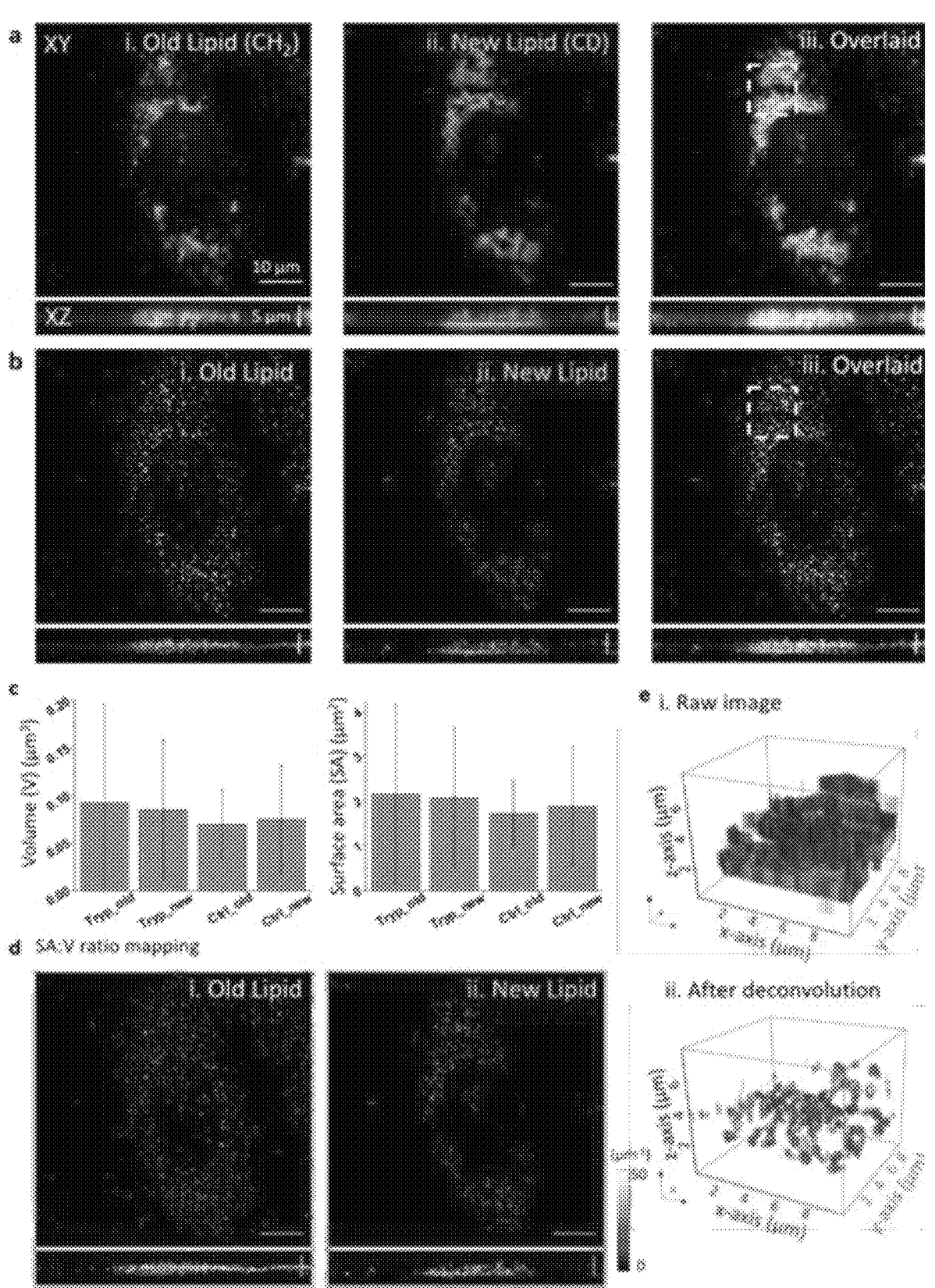
FIGS. 4A-4E. 3D super-resolution metabolic imaging of HeLa cell.

Direct visualization of LD metabolism under different conditions at the organelle level is crucial for uncovering the new signaling pathway and molecular mechanisms regulating lipid metabolism. Research in this area has been limited by a lack of spatial resolution in conventional lipidomic imaging modalities. A-PoD coupled DO-SRS metabolic imaging was applied to visualizing lipid metabolism in HeLa cancer cells cultured in the presence of $D_2O$. The distribution of LDs in HeLa cells was imaged at 2850 cm$^{-1}$ ($CH_2$ vibration) and 2140 cm$^{-1}$ (CD vibration), representing the old lipids and the newly synthesized lipids, respectively (FIG. 4A). After converting the images in each channel to super-resolved images using A-PoD, the differences in the distribution of old vs. new lipid signals were clearly revealed in 2D (FIG. 4B) and 3D rendered images (FIG. 4E). Thus the metabolic turnover rate of subpopulations of LDs can be quantified with SA:V ratio mapping. Before deconvolution, only areas with concentrated old and new LDs were visualized. After deconvolution, the three-dimensional shape and distribution of individual LDs were clearly visualized. Additionally, the surface area and volume of individual LDs were analyzed from cells cultured under different conditions: high tryptophan (15×, Trp) and standard control media (Ctrl). The standard deviation of surface area and volume of LDs in HeLa cells cultured in high tryptophan media were wider than those in the control group (FIG. 4C, FIGS. 11A-11C). The SA:V ratio of individual LDs was mapped in deconvolved images (FIG. 4D).

It has been proposed that LDs play a critical role in the neuroblast cell division and brain development. One major hurdle for understanding functional roles of LDs under physiological or pathological conditions is due to the limited imaging methods for direct observation of LD metabolic activity changes under physiological or pathological conditions. A-PoD-enhanced DO-SRS imaging was applied to directly visualize metabolic changes in Drosophila larval brains collected from animals on different diets. The DO-SRS image of the entire brain lobe collected at 2850 cm$^{-1}$ showed a large amount of lipids in larvae fed with the standard control diet (FIGS. 5A-5E).

Figures 12A, 12B:
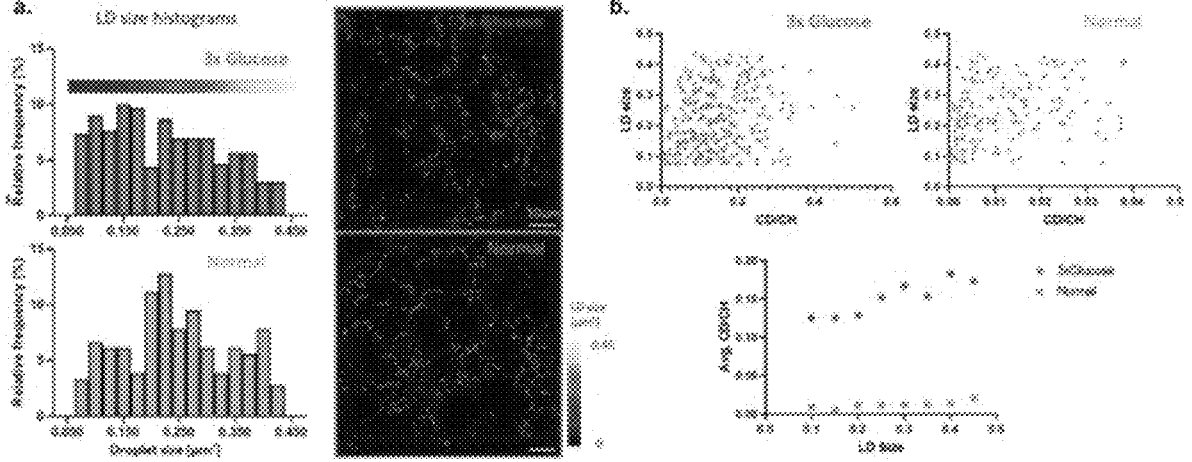
FIGS. 12A-12B. LD size and lipid turnover rate distribution.
Figures 13A, 13B:
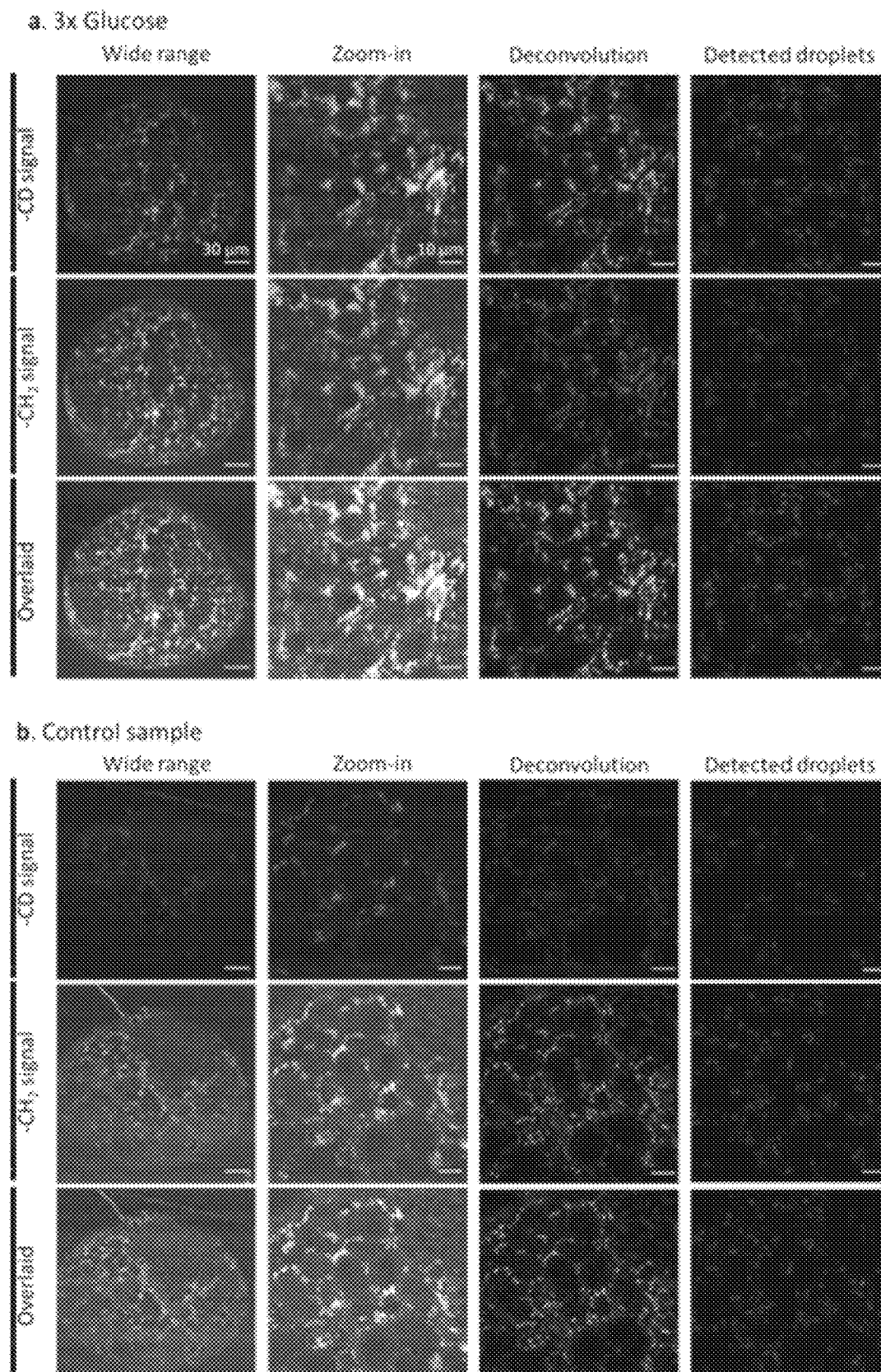
FIGS. 13A-13B. SRS images of larvae brain samples from flies fed on different diets.
Figures 14A, 14B, 14C:
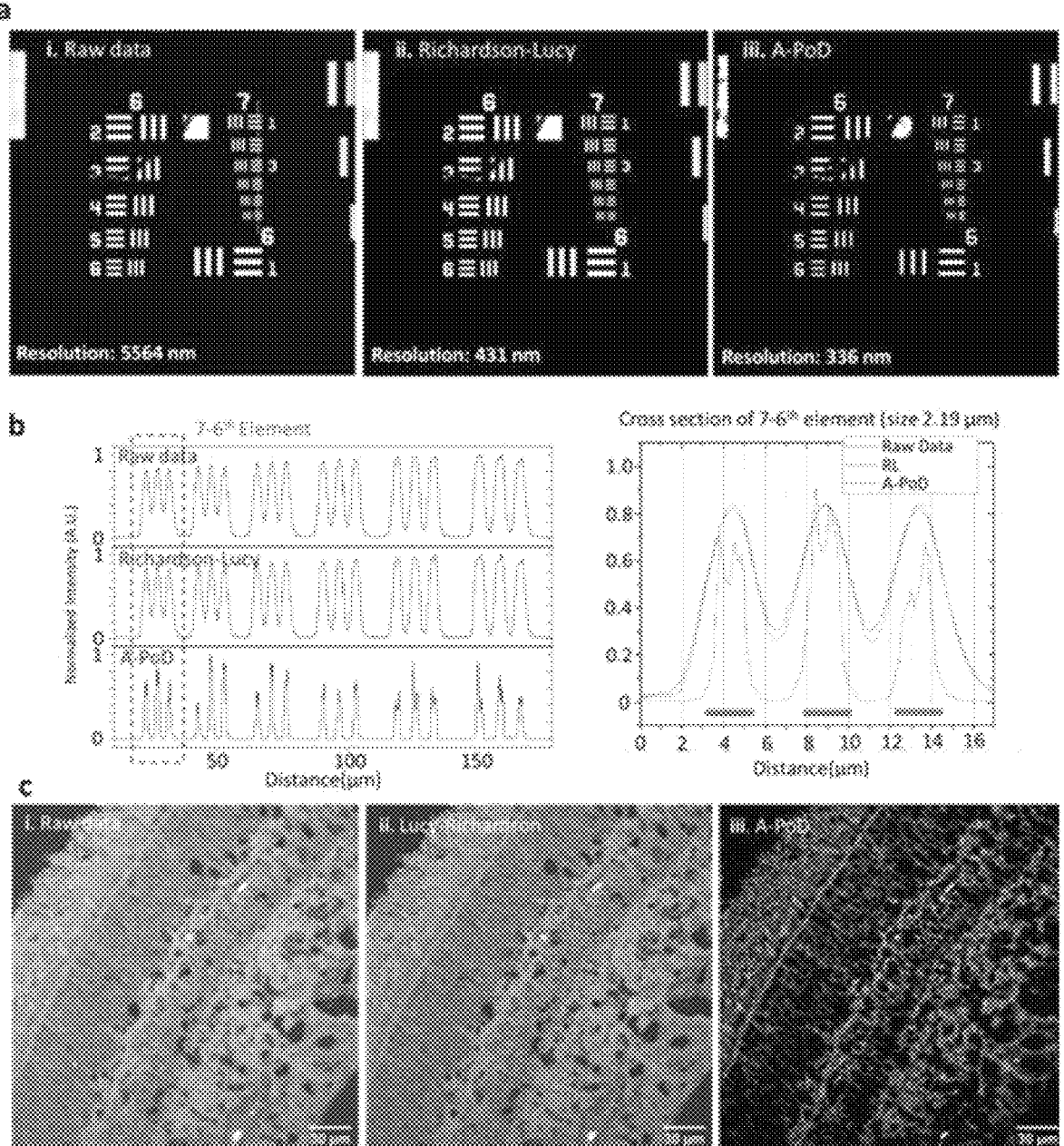
FIGS. 14A-14C. Comparison between A-PoD and the Richardson-Lucy method.

To determine the subcellular location of the lipids, the close-up images were taken from the central brain region. These images clearly revealed lipids inside LDs (small dot-like structures). Using A-PoD, the profile of individual LDs was acquired in order to compare the size distribution of LDs in the brain samples of flies fed standard diet with those fed with high glucose diet (3× glucose) (FIGS. 5A-5D, FIG. 12A). Size analysis showed that the LDs in 0.2~0.3 μm² range were predominant in the control group, whereas the LDs in the high glucose group showed a wider range of size distribution, with many small LDs in 0.1~0.2 μm² range. To better visualize the subcellular distribution of LDs of different sizes in situ, color coded images were generated to show the distribution of small (0.05~0.2 μm²), medium (0.2~0.3 μm²), and large (0.3~0.45 μm 2) LDs, respectively (FIG. 12A). Considering the small difference in the two histograms and the pixel size (163 nm) in the raw images, it is worth noting that this A-PoD enhanced SRS approach can measure the LD sizes of a wide range, 0.05~0.45 μm².

Figures 5A, 5B, 5C, 5D, 5E:
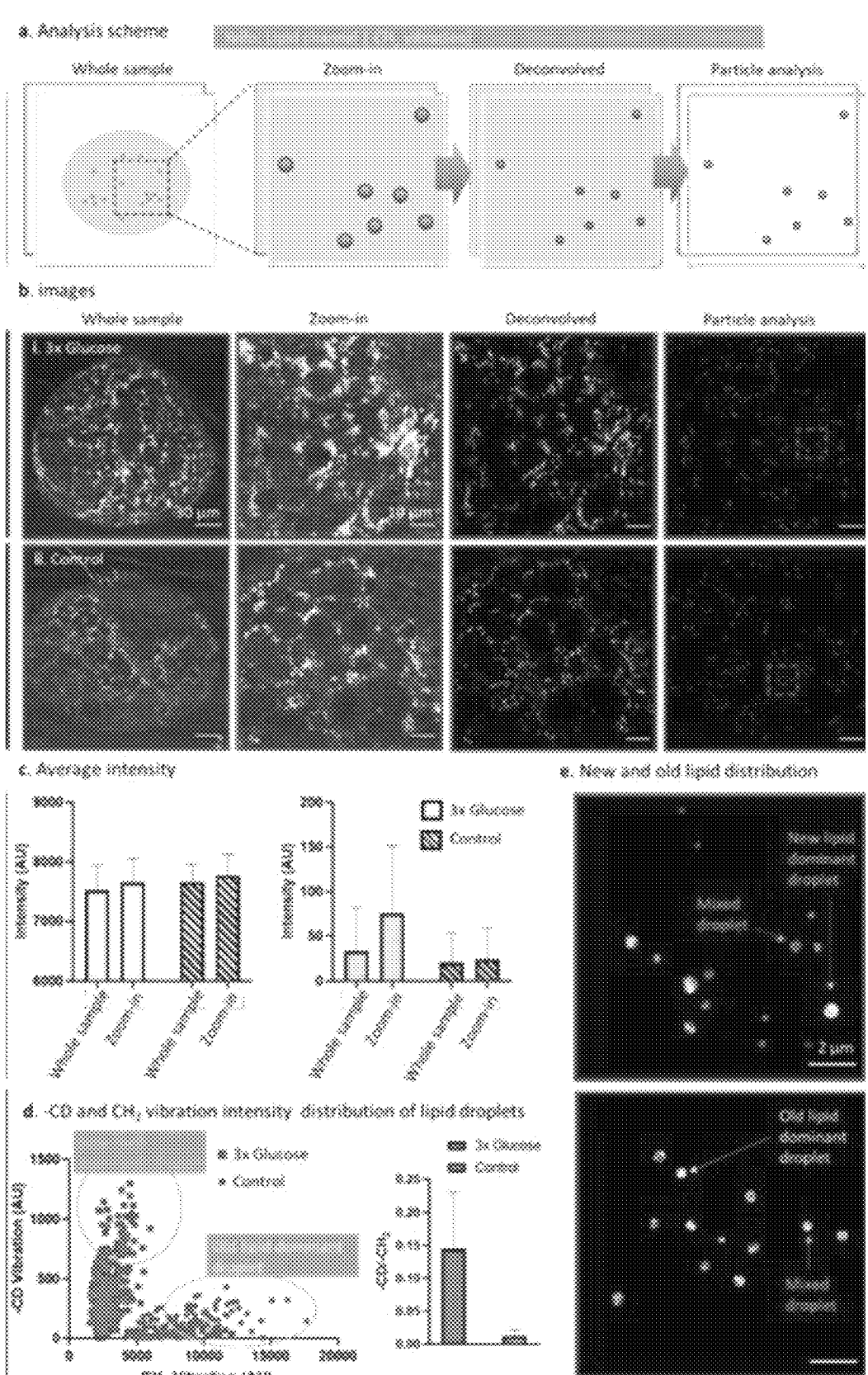
FIGS. 5A-5E. Super-resolution metabolic imaging of Drosophila brain samples.

Combined with $D_2O$ labeling, the lipid metabolic activities in the brain samples were measured. By measuring the LD size and turnover rates (FIG. 12B), the correlation between size and metabolic activity was quantified. The correlation coefficients were 0.44 in control flies and 0.40 in the high glucose group, with no significant differences detected. Both groups showed a positive correlation between LD size and metabolic activity, suggesting that larger LDs have higher metabolic activity. This result is consistent with studies on Drosophila fatbody metabolic activity[45-47]. Importantly, quantitative analyses of CD/$CH_2$ ratio showed that the average lipid turnover rate in the high glucose group was about 10 times higher than that in the control group, suggesting more newly synthesized lipids were accumulated in flies on high glucose diet (FIG. 5D, FIG. 12B). The A-PoD coupled DO-SRS combined with particle analysis further enabled mapping of distinct subpopulations of LDs: new lipid-dominant, old lipid-dominant and mixed LDs (FIG. 5E). Further studies are necessary to determine molecular mechanisms by which high glucose diet modulates lipid turnover rates.

Nanoscopic Co-Localization of Proteins, Lipids, and Fluorophores

Applying A-PoD to spatially correlated multi-photon fluorescence (MPF) imaging and SRS imaging, nanoscopic spatial distributions of proteins and lipids in mitochondria of live cells were examined (FIGS. 6A-6D). HEK293 cells were imaged with the mitochondria stably labeled with Mito-Red. The fluorescence signals of Mito-Red were measured using MPF. At the same time, SRS images of 2930 cm$^{-1}$ ($CH_3$ protein; in cyan) and 2850 cm$^{-1}$ ($CH_2$ lipid; in yellow) were also measured. The SRS images in the two different Raman shifts were unmixed into protein channel and lipid channel using an existing protocol (FIG. 6B)[3,48]. The images of these three measured channels were then converted into super-resolved images using A-PoD (FIG. 6C). Before deconvolution, there was a significant overlap of different types of signals (FIG. 6D). After deconvolution, the white area was reduced, and the different distribution of each component was clearly revealed (FIG. 6D). This is consistent with the fact that SRS signals for protein and lipid panels are not mitochondrion-specific proteins or lipids. On the other hand, the majority of Mito-Red signals (in magenta) were overlapping with lipid signals (in yellow), consistent with the fact that Mito-Red marked the mitochondrial membrane. Furthermore, in the signal intensity profile of the cross-section, the influence of the blurry background signal was reduced after deconvolution, and the position of each component was accurately expressed (FIG. 6D). These data showed that applying A-PoD to multiplexed MPF-SRS imaging significantly enhanced the resolution.

REFERENCES

1. Freudiger C W, Min W, Saar B G, Lu S, Holtom G R, He C, et al. Label-free biomedical imaging with high sensitivity by stimulated Raman scattering microscopy. Science. 2008;322(5909): 1857-61.
2. Ploetz E, Laimgruber S, Berner S, Zinth W, Gilch P. Femtosecond stimulated Raman microscopy. Applied Physics B. 2007;87(3):389-93.
3. Shi L, Zheng C, Shen Y, Chen Z, Silveira E S, Zhang L, et al. Optical imaging of metabolic dynamics in animals. Nature communications. 2018;9(1):1-17.
4. Betzig E, Patterson G H, Sougrat R, Lindwasser O W, Olenych S, Bonifacino J S, et al. Imaging intracellular fluorescent proteins at nanometer resolution. Science. 2006;313(5793):1642-5.
5. Hell S W, Wichmann J. Breaking the diffraction resolution limit by stimulated emission: stimulated-emission-depletion fluorescence microscopy. Optics letters. 1994;19(11): 780-2.
6. Hess S T, Girirajan T P, Mason M D. Ultra-high resolution imaging by fluorescence photoactivation localization microscopy. Biophysical journal. 2006;91(11):4258-72.
7. Weber M, Leutenegger M, Stoldt S, Jakobs S, Mihaila T S, Butkevich A N, et al. MINSTED fluorescence localization and nanoscopy. Nature photonics. 2021;15(5): 361-6.
8. Gwosch K C, Pape J K, Balzarotti F, Hoess P, Ellenberg J, Ries J, et al. MINFLUX nanoscopy delivers 3D multicolor nanometer resolution in cells. Nature methods. 2020;17(2):217-24.
9. Ghosh A, Sharma A, Chizhik A I, Isbaner S, Ruhlandt D, Tsukanov R, et al. Graphene-based metal-induced energy transfer for sub-nanometre optical localization. Nature Photonics. 2019;13(12):860-5.
10. Ao J, Fang X, Miao X, Ling J, Kang H, Park S, et al. Switchable stimulated Raman scattering microscopy with photochromic vibrational probes. Nature communications. 2021;12(1):1-8.
11. Qian C, Miao K, Lin L-E, Chen X, Du J, Wei L. Super-resolution label-free volumetric vibrational imaging. Nature Communications. 2021;12(1):1-10.
12. Xiong H, Qian N, Miao Y, Zhao Z, Chen C, Min W. Super-resolution vibrational microscopy by stimulated Raman excited fluorescence. Light: Science & Applications. 2021;10(1):1-10.
13. Gong L, Zheng W, Ma Y, Huang Z. Saturated Stimulated-Raman-Scattering Microscopy for Far-Field Super-resolution Vibrational Imaging. Physical Review Applied. 2019;11(3):034041.
14. Gong L, Wang H. Breaking the diffraction limit by saturation in stimulated-Raman-scattering microscopy: A theoretical study. Physical Review A. 2014;90(1):013818.
15. Gong L, Wang H. Suppression of stimulated Raman scattering by an electromagnetically-induced-transparency-like scheme and its application for super-resolution microscopy. Physical Review A. 2015;92(2):023828.
16. Silva W R, Graefe C T, Frontiera R R. Toward Label-Free Super-Resolution Microscopy. ACS Photonics. 2016;3(1):79-86.
17. Shi L, Klimas A, Gallagher B, Cheng Z, Fu F, Wijesekara P, et al. Super-resolution vibrational imaging using expansion stimulated Raman scattering microscopy. Advanced Science. 2022;9(13):2200315.
18. Tzang O, Pevzner A, Marvel R E, Haglund R F, Cheshnovsky O. Super-Resolution in Label-Free Photomodulated Reflectivity. Nano Letters. 2015;15(2):1362-7.
19. Guilbert J, Negash A, Labouesse S, Gigan S, Sentenac A, de Aguiar H B. Label-free super-resolution chemical imaging of biomedical specimens. bioRxiv. 2021.
20. Sage D, Donati L, Soulez F, Fortun D, Schmit G, Seitz A, et al. DeconvolutionLab2: An open-source software for deconvolution microscopy. Methods. 2017;115:28-41.
21. Zhu L, Zhang W, Elnatan D, Huang B. Faster STORM using compressed sensing. Nature methods. 2012;9(7): 721-3.
22. Min J, Vonesch C, Kirshner H, Carlini L, Olivier N, Holden S, et al. FALCON: fast and unbiased reconstruction of high-density super-resolution microscopy data. Scientific reports. 2014;4(1):1-9.
23. Hugelier S, De Rooi J J, Bernex R, Duwé S, Devos O, Sliwa M, et al. Sparse deconvolution of high-density super-resolution images. Scientific reports. 2016;6(1):1-11.
24. Martinez S, Toscani M, Martinez O E. Superresolution method for a single wide-field image deconvolution by superposition of point sources. Journal of microscopy. 2019;275(1):51-65.
25. Wallace W, Schaefer L H, Swedlow J R. A workingperson's guide to deconvolution in light microscopy. Biotechniques. 2001;31(5):1076-97.
26. Holden S J, Uphoff S, Kapanidis A N. DAOSTORM: an algorithm for high-density super-resolution microscopy. Nature methods. 2011;8(4):279-80.
27. Shi L, Rodríguez-Contreras A, Alfano R R. Gaussian beam in two-photon fluorescence imaging of rat brain microvessel. Journal of biomedical optics. 2014;19(12): 126006.
28. Chaigneau E, Wright A J, Poland S P, Girkin J M, Silver R A. Impact of wavefront distortion and scattering on 2-photon microscopy in mammalian brain tissue. Optics express. 2011;19(23):22755-74.
29. Tzarouchis D, Sihvola A. Light scattering by a dielectric sphere: perspectives on the Mie resonances. Applied Sciences. 2018;8(2):184.
30. Ji N, Milkie D E, Betzig E. Adaptive optics via pupil segmentation for high-resolution imaging in biological tissues. Nature methods. 2010;7(2):141-7.
31. Zhang B, Zhu J, Si K, Gong W. Deep learning assisted zonal adaptive aberration correction. Frontiers in Physics. 2021;8:634.
32. Descloux A, Grußmayer K S, Radenovic A. Parameter-free image resolution estimation based on decorrelation analysis. Nature methods. 2019;16(9):918-24.
33. Boesze-Battaglia K, Yeagle P L. Rod outer segment disc membranes are capable of fusion. Investigative ophthalmology & visual science. 1992;33(3):484-93.
34. Abramczyk H, Surmacki J, Kopeć M, Olejnik A K, Lubecka-Pietruszewska K, Fabianowska-Majewska K. The role of lipid droplets and adipocytes in cancer. Raman imaging of cell cultures: MCF10A, MCF7, and MDA-MB-231 compared to adipocytes in cancerous human breast tissue. Analyst. 2015;140(7):2224-35.
35. Bagheri P, Hoang K, Fung A A, Hussain S, Shi L. Visualizing Cancer Cell Metabolic Dynamics Regulated With Aromatic Amino Acids Using DO-SRS and 2PEF Microscopy. Frontiers in Molecular Biosciences. 2021;8.

36. Fung A, Hoang K, Zha H, Chen D, Zhang W, Shi L. Imaging Sub-Cellular Methionine and Insulin Interplay in Triple Negative Breast Cancer Lipid Droplet Metabolism. Front. Oncol. 2022;12:858017.

37. Jarc E, Petan T. Focus: Organelles: Lipid droplets and the management of cellular stress. The Yale journal of biology and medicine. 2019;92(3):435.

38. Li X, Li Y, Jiang M, Wu W, He S, Chen C, et al. Quantitative imaging of lipid synthesis and lipolysis dynamics in Caenorhabditis elegans by stimulated Raman scattering microscopy. Analytical chemistry. 2018;91(3): 2279-87.

39. Lisec J, Jaeger C, Rashid R, Munir R, Zaidi N. Cancer cell lipid class homeostasis is altered under nutrient-deprivation but stable under hypoxia. BMC cancer. 2019; 19(1):1-11.

40. Paar M, Jüngst C, Steiner N A, Magnes C, Sinner F, Kolb D, et al. Remodeling of lipid droplets during lipolysis and growth in adipocytes. Journal of Biological Chemistry. 2012;287(14): 11164-73.

41. Rysman E, Brusselmans K, Scheys K, Timmermans L, Derua R, Munck S, et al. De novo lipogenesis protects cancer cells from free radicals and chemotherapeutics by promoting membrane lipid saturation. Cancer research. 2010;70(20):8117-26.

42. Schott M B, Weller S G, Schulze R J, Krueger E W, Drizyte-Miller K, Casey C A, et al. Lipid droplet size directs lipolysis and lipophagy catabolism in hepatocytes. Journal of Cell Biology. 2019;218(10):3320-35.

43. Schug Z, Peck B, Jones D, Zhang Q, Alam I, Witney T, et al. Acetyl-coA synthetase 2 promotes acetate utilization and maintains cell growth under metabolic stress. Cancer & Metabolism. 2014;2(1):1-.

44. Wolins N E, Quaynor B K, Skinner J R, Schoenfish M J, Tzekov A, Bickel P E. S3-12, Adipophilin, and TIP47 package lipid in adipocytes. Journal of Biological Chemistry. 2005;280(19): 19146-55.

45. Li Y, Zhang W, Fung A A, Shi L. DO-SRS imaging of diet regulated metabolic activities in Drosophila during aging processes. Aging Cell. 2022:e13586.

46. Li Y, Zhang W, Fung A A, Shi L. DO-SRS imaging of metabolic dynamics in aging Drosophila. Analyst. 2021; 146(24):7510-9.

47. Li Y, Bagheri P, Chang P, Zeng A, Hao J, Fung A, et al. Direct Imaging of Lipid Metabolic Changes in Drosophila Ovary During Aging Using DO-SRS Microscopy. Frontiers in Aging. 2022;2.

48. Lu F-K, Basu S, Igras V, Hoang M P, Ji M, Fu D, et al. Label-free DNA imaging in vivo with stimulated Raman scattering microscopy. Proceedings of the National Academy of Sciences. 2015;112(37):11624-9.

49. Wei M, Shi L, Shen Y, Zhao Z, Guzman A, Kaufman L J, et al. Volumetric chemical imaging by clearing-enhanced stimulated Raman scattering microscopy. Proceedings of the National Academy of Sciences. 2019;116 (14):6608-17.

50. Bae K, Xin L, Zheng W, Tang C, Ang B-T, Huang Z. Mapping the Intratumoral heterogeneity in Glioblastomas with Hyperspectral stimulated Raman scattering microscopy. Analytical Chemistry. 2021;93(4):2377-84.

51. Gong L, Lin S, Huang Z. Stimulated Raman Scattering Tomography Enables Label-Free Volumetric Deep Tissue Imaging. Laser & Photonics Reviews. 2021;15(9): 2100069.

52. Shi L, Wei M, Miao Y, Qian N, Shi L, Singer R A, et al. Highly-multiplexed volumetric mapping with Raman dye imaging and tissue clearing. Nature Biotechnology. 2021: 1-10.

53. Wilfling F, Haas J T, Walther T C, Farese R V, Jr. Lipid droplet biogenesis. Curr Opin Cell Biol. 2014;29:39-45.

54. Wilfling F, Wang H, Haas J T, Krahmer N, Gould T J, Uchida A, et al. Triacylglycerol synthesis enzymes mediate lipid droplet growth by relocalizing from the ER to lipid droplets. Dev Cell. 2013;24(4):384-99.

55. Back S H, Kaufman R J. Endoplasmic reticulum stress and type 2 diabetes. Annual review of biochemistry. 2012;81:767-93.

56. Yamamoto K, Takahara K, Oyadomari S, Okada T, Sato T, Harada A, et al. Induction of liver steatosis and lipid droplet formation in ATF6α-knockout mice burdened with pharmacological endoplasmic reticulum stress. Molecular biology of the cell. 2010;21(17):2975-86.

57. Moncan M, Mnich K, Blomme A, Almanza A, Samali A, Gorman A M. Regulation of lipid metabolism by the unfolded protein response. Journal of cellular and molecular medicine. 2021;25(3):1359-70.

58. Tabet M, Urban I I I F. Deconvolution of tip affected atomic force microscope images and comparison to Rutherford backscattering spectrometry. Journal of Vacuum Science & Technology B: Microelectronics and Nanometer Structures Processing, Measurement, and Phenomena. 1997;15(4):800-4.

59. Lee H, Yoo H, Moon G, Toh K-A, Mochizuki K, Fujita K, et al. Super-resolved Raman microscopy using random structured light illumination: Concept and feasibility. The Journal of Chemical Physics. 2021;155(14):144202.

60. Watanabe K, Palonpon A F, Smith N I, Chiu L-d, Kasai A, Hashimoto H, et al. Structured line illumination Raman microscopy. Nature communications. 2015;6(1): 1-8.

61. Zhao W, Zhao S, Li L, Huang X, Xing S, Zhang Y, et al. Sparse deconvolution improves the resolution of live-cell super-resolution fluorescence microscopy. Nature Biotechnology. 2021:1-12.

62. Starck J L, Pantin E, Murtagh F. Deconvolution in Astronomy: A Review. Publications of the Astronomical Society of the Pacific. 2002;114(800):1051-69.

63. Lucy L B. An iterative technique for the rectification of observed distributions. The astronomical journal. 1974; 79:745.

64. Zhou R, Han B, Xia C, Zhuang X. Membrane-associated periodic skeleton is a signaling platform for RTK trans-activation in neurons. Science. 2019;365(6456):929-34.

65. Xiao S, Gritton H, Tseng H-a, Zemel D, Han X, Mertz J. High-contrast multifocus microscopy with a single camera and z-splitter prism. Optica. 2020;7(11):1477-86.

66. Stein S C, Huss A, Hähnel D, Gregor I, Enderlein J. Fourier interpolation stochastic optical fluctuation imaging. Optics express. 2015;23(12):16154-63.

67. Mandracchia B, Hua X, Guo C, Son J, Urner T, Jia S. Fast and accurate sCMOS noise correction for fluorescence microscopy. Nature communications. 2020;11(1): 1-12.

68. Blu T, Luisier F. The SURE-LET approach to image denoising. IEEE Transactions on Image Processing. 2007; 16(11):2778-86.

69. Kingma D P, Ba J. Adam: A method for stochastic optimization. arXiv preprint arXiv:14126980. 2014.

70. Kirshner H, Aguet F, Sage D, Unser M. 3-D PSF fitting for fluorescence microscopy: implementation and localization application. Journal of microscopy. 2013;249(1): 13-25.

71. Deng J, Yang M, Chen Y, Chen X, Liu J, Sun S, et al. FUS interacts with HSP60 to promote mitochondrial damage. PLoS genetics. 2015;11(9):e1005357.

72. Rust M J, Bates M, Zhuang X. Sub-diffraction-limit imaging by stochastic optical reconstruction microscopy (STORM). Nature methods. 2006;3(10):793-6.

73. Bintu B, Mateo L J, Su J-H, Sinnott-Armstrong N A, Parker M, Kinrot S, et al. Super-resolution chromatin tracing reveals domains and cooperative interactions in single cells. Science. 2018;362(6413):eaau1783.

74. S. Hugelier, J. J. De Rooi, R. Bernex et al., "Sparse deconvolution of high-density super-resolution images," Scientific Reports, 6(1), 1-11 (2016.

The invention claimed is:

1. A deconvolution method for generating a series of super-resolved images, the deconvolution method comprising:

applying an Adam optimization-based Pointillism Deconvolution (A-POD) algorithm to an image; and generating a series of super-resolved images.

2. The deconvolution method of claim 1, wherein the deconvolution method is effective to enhance special resolution of an image at a high processing speed.

3. The deconvolution method of claim 1, wherein the series of super-resolved images enables examination of protein and lipid distribution at a nanoscopic level.

4. The deconvolution method of claim 3, wherein the examination of protein and lipid distribution involves direct visualization of lipid metabolic changes in cells or brain tissue.

5. The deconvolution method of claim 1, wherein the A-Pod algorithm is configured for use with one or more gradient descent optimization algorithms.

6. The deconvolution method of claim 1, wherein generating the series of super-resolved images includes removing one or more low frequency signals.

7. The deconvolution method of claim 6, wherein the one or more low frequency signals are removed using spline or Fourier filtering methods.

8. The deconvolution method of claim 1, further comprising automatically estimating one or more virtual emitters based on a measured characteristic of the image.

9. The deconvolution method of claim 8, wherein the measured characteristic of the image is a variance and/or a mean intensity of the image.

10. The deconvolution method of claim 1, wherein the image is derived from photoacoustic microscopy, infrared microscopy, and/or phase contrast microscopy.

11. The deconvolution method of claim 10, wherein the super-resolved images enable determination of a point spread function of the image.

12. The deconvolution method of claim 1, wherein a range in which the A-Pod algorithm is applied is based on a frequency domain of the image.

13. A method of processing cellular images, the method comprising:

interpolating cellular images along an optical axis;

resampling the cellular images; and optimizing the cellular images with an A-POD algorithm, wherein resulting cellular images are deconvoluted cellular images.

14. The method of claim 13, wherein the A-POD algorithm is customizable according to a pixel size of the cellular images.

15. The method of claim 13, further comprising:

counting lipid droplets of the deconvoluted cellular images.

* * * * *